United States Patent [19]

Wahle et al.

[11] Patent Number: 4,595,025
[45] Date of Patent: Jun. 17, 1986

[54] APPARATUS FOR REPLENISHING THE SUPPLIES OF FILTER ROD SECTIONS IN THE MAGAZINES OF FILTER TIPPING MACHINES

[75] Inventors: Günter Wahle, Reinbek; Alois Kasparek, Hamburg, both of Fed. Rep. of Germany

[73] Assignee: Hauni-Werke Körber & Co. KG, Hamburg, Fed. Rep. of Germany

[21] Appl. No.: 455,562

[22] Filed: Jan. 4, 1983

Related U.S. Application Data

[63] Continuation-in-part of Ser. No. 230,417, Feb. 2, 1981, abandoned.

[30] Foreign Application Priority Data

Oct. 21, 1982 [DE] Fed. Rep. of Germany ....... 3238902

[51] Int. Cl.⁴ .............................................. A24C 5/52
[52] U.S. Cl. ..................................... 131/94; 131/282
[58] Field of Search ................... 131/282, 283, 94, 95; 406/70, 155

[56] References Cited

U.S. PATENT DOCUMENTS 3,608,972 9/1971 Rudszinat .............................. 406/70
3,789,744 2/1974 Wahle ................................... 131/94
4,264,242 4/1981 Lecomte ............................. 406/155

Primary Examiner—V. Millin
Attorney, Agent, or Firm—Peter K. Kontler

[57] ABSTRACT

A combination of production lines for the manufacture of filter cigarettes wherein the filter tipping machines form several groups. The number of groups exceeds by one the number of machines in a group. Each machine receives filter rod sections from one of two different pneumatic senders by way of one of two discrete pneumatic conveyors. Each sender has a hopper for sections and several pneumatic propelling units which deliver sections from the respective hopper into the corresponding conveyors. The possibility of feeding sections to each machine from either one of two discrete senders ensures that the machines need not be shut down in the event of malfunction of a given sender, of one of the two propelling units for a machine or of one of two conveyors for a machine. Receiving units between the discharge ends of the pneumatic conveyors and the magazines of the respective machines convert files of sections which issue from the pneumatic conveyors into rows and effect forcible admission of sections into the magazines.

30 Claims, 14 Drawing Figures

APPARATUS FOR REPLENISHING THE SUPPLIES OF FILTER ROD SECTIONS IN THE MAGAZINES OF FILTER TIPPING MACHINES

CROSS-REFERENCE TO RELATED CASES

This is a continuation-in-part of our copending application Ser. No. 230,417, filed Feb. 2, 1981, now abandoned.

Certain details of the apparatus which embodies the present invention are identical with or similar to those of the apparatus which is disclosed in the commonly owned copending application Ser. No. 228,966 filed Jan. 27, 1981 by Günter Wahle et al. for "Apparatus for replenishing the supplies of filter rod sections in the magazines of filter tipping machines", now U.S. Pat. No. 4,368,742 granted 1983.

BACKGROUND OF THE INVENTION

The present invention relates to apparatus for replenishing the supplies of filter rod sections in the magazines of filter processing machines, especially in the magazines of filter tipping machines. More particularly, the invention relates to improvements in apparatus for manipulating filter rod sections wherein machines which process filter rod sections receive such sections by way of pneumatic senders serving to admit rod-shaped articles into pneumatic conveyors which, in turn, deliver the articles to the magazines of the processing machines.

It is already known to transport filter rod sections from a maker to a processing machine by resorting to a pneumatic sender which cooperates with a pneumatic conveyor, and to a receiver at the discharge end of the pneumatic conveyor. The sender has a propelling unit which delivers filter rod sections into the inlet of the pneumatic conveyor wherein the sections move axially, and the receiving unit is provided with means for changing the direction of movement of successively delivered filter rod sections from axial movement to sidewise movement preparatory to and during introduction into the magazine of the processing machine. The just discussed systems for delivery of filter rod sections from a maker to a processing machine are used in preference to older systems which employ so-called chargers or trays. The systems which employ chargers exhibit a number of drawbacks, especially as regards their bulk, the cost of the chargers and other equipment, as well as the number of chargers which are needed to accumulate and maintain a requisite supply of articles between the maker and the processing machine. Moreover, the trend is toward the establishment of complete production lines, i.e., a manufacturer of filter cigarettes prefers to set up several lines wherein one or more machines produce filter rod sections, wherein one or more machines produce plain cigarettes, and wherein one or more filter tipping machines combine plain cigarettes with filter rod sections to form filter cigarettes of desired length. The use of chargers in such production lines is cumbersome; therefore, the chargers are on the way out, at least in the majority of tobacco processing plants.

It is often desirable to install a reservoir system between one or more makers of filter rod sections and the pneumatic sender to thus ensure that the sender can receive filter rod sections for a reasonably long interval of time if and when the maker breaks down or is intentionally arrested by the attendants. The reservoir system (e.g., a system known as RESY and manufactured by the assignee of the present application) can compensate for differences between the output of a maker of filter rod sections and the requirements of one or more processing machines, especially filter tipping machines. Moreover, the reservoir system can serve as a depository for filter rod sections during the interval of curing which follows the making of filter rod sections and must precede the conversion of such sections into filter plugs of cigarettes or analogous rod-shaped smokers' products. The provision of reservoir systems is desirable on the additional ground that the output of a modern filter tipping machine is very high (normally in the range of one hundred cigarettes per second) so that the utilization of a reservoir system ensures that the filter tipping machine can operate for a reasonable period of time subsequent to deactivation or a slowdown of the producing machine or machines. The magazine of a filter tipping machine is much too small to store a reasonable supply of filter rod sections so that, in the absence of a reservoir system or another relatively large source of supply of filter rod sections, the filter tipping machine would have to be shut down in immediate response to stoppage of the associated filter rod making machine or machines. As a rule, the supply of filter rod sections in the magazine of a filter tipping machine merely suffices to compensate for extremely short interruptions in delivery of fresh filter rod sections from a maker, either directly or by way of a reservoir system.

U.S Pat. No. 3,397,922 discloses an apparatus which is designed to pneumatically convey cigarettes to packing machines. FIG. 1 of this patent shows the magazine of a packing machine and four receivers each of which is connected with one of four senders by a discrete pneumatic conveyor. The senders are grouped into sets of two senders each, and each such set is associated with a discrete cigarette maker. If one of the cigarette makers is out of commission, the packing machine continues to receive cigarettes from two senders, i.e., from the other cigarette maker, so that the packing machine continues to operate but its output is reduced in half. The specification of the aforementioned patent further discloses the possibility of utilizing a total of eight receivers which serve to supply cigarettes into the magazine of a packing machine, and of associating each cigarette maker with four senders. This would appear to render it possible to combine four packing machines with eight cigarette makers by resorting to a total of thirtytwo pneumatic conveyors in such a way that each packing machine receives cigarettes from each of the eight cigarette makers. Thus, if one of the cigarette makers is out of commission, the output of each of the four packing machines is reduced by one-eighth.

The proposals in the aforediscussed patent are unrealistic in view of the well known fact that pneumatic transport of cigarettes at speeds which are required in a modern filter tipping or packing machine is not contemplated by the manufacturers of smokers' products due to the impossibility of avoiding damage to and/or extensive deformation of cigarettes which are transported in pneumatic conveyors and treated in senders and/or receivers at the rate of one-hundred or more per second. Furthermore, and if the teaching of the aforediscussed patent were transferred into the field of processing filter rod sections of the type used in the manufacture of filter cigarettes, cigars or cigarillos, one would be confronted with the very difficult task of placing eight receivers at a level above the magazine of a filter tipping machine wherein the magazine is normally located at a level well above the floor. Moreover, the incorporation of the teaching of the aforediscussed patent into the production lines for filter cigarettes, cigars or cigarillos (hereinafter called filter cigarettes for short) would bring about the drawback that the incapacitation of a single filter rod making machine (which, by following the patented proposal regarding cigarette makers and cigarette packing machines, would have to be associated with four filter tipping machines) would entail a reduction of the output of four filter tipping machines. This is not in keeping with the best mode of operation of modern filter tipping machines which should be kept running at the full operating speed irrespective of eventual problems in connection with the operation of associated filter rod making machines and/or in connection with the delivery of filter rod sections.

Another important difference between production lines including cigarette makers and associated packing machines on the one hand, and production lines including filter rod making machines and filter tipping machines on the other hand, is that a packing machine can process the output of several cigarette makers whereas a filter rod making machine can satisfy the requirements of several filter tipping machines. Thus, it is neither simple nor close at hand to incorporate the features of a production line embodying cigarette makers and associated packing machines in utterly different production lines wherein filter tipping machines receive the output of a filter rod making machine.

OBJECTS AND SUMMARY OF THE INVENTION

An object of the invention is to provide an apparatus which can manipulate filter rod sections, which embodies one or more filter rod processing machines, and which is provided with novel and improved means for replenishing the supply of filter rod sections in the magazine or magazines of one or more processing machines so that the operation of the processing machines need not be regulated in dependency on the availability of filter rod sections.

Another object of the invention is to provide an apparatus which ensures that a single processing machine or an entire battery of processing machines invariably receives filter rod sections in requisite quantities even if portions of the system which supplies filter rod sections to the machines break down or are intentionally deactivated by the attendants for shorter or extended intervals of time.

A further object of the invention is to provide the apparatus with a novel and improved control system which can invariably ensure the delivery of filter rod sections to one or more processing machines at the rate at which the filter rod sections are processed in such machines regardless of whether the number of processing machines is minimal, small or substantial.

An additional object of the invention is to provide novel and improved means for delivering filter rod sections from a battery of makers of such articles to a battery of machines which process filter rod sections, especially to filter tipping machines for the production of filter cigarettes or the like.

Another object of the invention is to provide novel and improved means for monitoring the operation of means which deliver filter rod sections from one or more makers to a plurality of processing or consuming machines.

A further object of the invention is to provide a fully automatic system for replenishing the supplies of filter rod sections in the magazines of filter tipping and analogous processing or consuming machines.

The invention resides in the provision of an apparatus for manipulating filter rod sections, e.g., filter rod sections of six or eight times unit length which are ready for processing in filter tipping machines. The apparatus comprises processing means including several processing machines (especially filter tipping machines) each having a magazine, conveyor means including first and second pneumatic conveyors for each processing machine and each having an inlet and an outlet, sender means including first and second pneumatic senders each of which has a source of filter rod sections and a plurality of propelling units, each propelling unit of the first sender being operable to deliver filter rod sections from the respective source to the inlet of a first conveyor and each propelling unit of the second sender being operable to deliver filter rod sections from the respective source to the inlet of a second conveyor, receiving means for transferring into the magazines filter rod sections which are supplied by the outlets of the respective first and second conveyors, and means for independently starting and arresting each propelling unit of each of the pneumatic senders. The pneumatic conveyors preferably include means for conveying the filter rod sections lengthwise (i.e., at least substantially axially), and each of the receiving means preferably includes means for delivering filter rod sections into the respective magazines by moving the filter rod sections sideways (i.e., at least substantially at right angles to the axes of the filter rod sections).

The apparatus further comprises signal generating means including at least one signal generator for each propelling unit. Each signal generator is arranged to transmit a signal denoting a malfunction of the respective propelling unit and/or a malfunction of the corresponding pneumatic conveyor. Such apparatus preferably further comprises control means, one for each first conveyor and the corresponding second conveyor, and each control means comprises means for normally effecting the operation of only one of the propelling units which deliver filter rod sections to the respective first and second conveyors. Each control means further comprises means for automatically starting the other propelling unit in the event of malfunction of the one propelling unit and/or in the event of malfunction of the associated conveyor, or vice versa.

The signal generating means can comprise a plurality of mechanical, optical or otherwise designed signal generators for each propelling unit and the corresponding conveyor. Each first conveyor and the corresponding second conveyor, as well as the associated propelling units, can have portions which are likely to develop malfunctions (e.g., because they are apt to jam and/or because they are contaminated or otherwise affected by the conveyed filter rod sections and/or wear). The signal generators are then positioned and designed to generate signals in response to development of malfunctions at such portions of the respective propelling units and conveyors.

Each of the propelling units can comprise means for interrupting (e.g., blocking) the removal of filter rod sections from the respective source, and the aforementioned control means can include means (e.g., electromagnets) for activating the interrupting means of the respective propelling units in the event of malfunction of the corresponding propelling unit and/or the associated conveyor. If the signal generating means comprises a plurality of signal generators for each propelling unit and the corresponding conveyor, and if each such propelling unit and conveyor has one or more portions which are likely to develop or cause malfunctions, the signal generators are preferably positioned to generate signals in response to development of malfunctions at the aforementioned portions of the propelling units and the respective conveyors. The control means then includes means for activating the interrupting means of a propelling unit in response to a signal from any one of the corresponding signal generators.

The filter processing means can comprise several (e.g., five) groups of m machines each (e.g., each group can comprise four filter tipping machines), and the sender means can include a sender for each group of processing machines and can comprise 2m propelling units. The conveyor means then comprises a set of 2m conveyors for each sender and each such set includes conveyors connecting m propelling units of one of the senders with the processing machines of one of the groups as well as conveyors connecting the remaining m propelling units of the respective sender with one machine each of each other group of machines. In such apparatus, the filter processing means preferably comprises m+1 groups of processing machines.

Each receiving means can include discrete first and second receiving units for transfer of filter rod sections from the respective first and second conveyors into the magazine of the corresponding processing machine. Each receiving unit can comprise means for forcibly feeding filter rod sections into the magazine of the respective processing machine. If each receiving means comprises two discrete receiving units, the feeding means of such receiving units are preferably spaced apart from each other so that the filter rod sections which are delivered by the respective first and second conveyors enter different portions of the corresponding magazine. Such feeding means can be disposed at the opposite sides of the respective magazine so that the admission of filter rod sections at one side of a magazine does not interfere with and is not impeded by the filter rod sections which were admitted previously at the other side of the same magazine. Each feeding means (irrespective of whether or not a receiving means comprises one or more receiving units) can comprise a plurality of endless flexible elements which define channels for the passage of filter rod sections into the respective magazine. Such endless flexible elements may constitute belts having parallel reaches which define the aforementioned channels.

Each control means can comprise means for monitoring the supplies of filter rod sections in the respective magazines, and each control means can further comprise means for actuating one of the respective propelling units when the supply of filter rod sections in a magazine is reduced to a given minimum value. Such control means can further comprise means for arresting the operative propelling unit (namely, that propelling unit which is in the process of admitting filter rod sections into the inlet of the associated pneumatic conveyor) when the supply of filter rod sections in a magazine rises to a predetermined maximum value.

Each control unit can comprise first and second means for monitoring the supply of filter rod sections in the respective magazine. Each first monitoring means can include means for initiating the delivery of filter rod sections from the respective propelling unit of the first sender when the supply of filter rod sections in the magazine is depleted below a first level, and each second monitoring means can comprise means for initiating the delivery of filter rod sections by the respective propelling unit of the second sender when the supply of filter rod sections in the magazine is depleted below a lower second level. Each means for initiating the delivery of filter rod sections can include a first signal generator, and each first monitoring means can further comprise a second signal generator which interrupts the delivery of filter rod sections by the respective propelling unit when the supply of filter rod sections in the corresponding magazine is replenished to a given value. Each of the aforementioned means for initiating the delivery of filter rod sections can further comprise a third signal generator which serves to transmit a signal when the supply of filter rod sections in the respective magazine is depleted to the aforementioned second level, and a fourth signal generator which interrupts the delivery of filter rod sections by the respective propelling unit when the supply of filter rod sections in such magazine is replenished. The fourth signal generator of each second monitoring means can constitute the second signal generator of the respective first monitoring means.

The apparatus can further comprise at least one junction, e.g., a junction for the first and second conveyors which deliver filter rod sections to the magazine of at least one processing machine. The outlets of the just mentioned first and second conveyors are then located at such junction, and the junction can include an additional pneumatic conveyor for delivery of filter rod sections from the outlet of one of the respective first and second conveyors to the magazine or receiving means of the respective processing machine. The additional conveyor has an inlet at the or close to the outlets of the respective first and second conveyors, and the apparatus can further comprise a pair of electromagnets or other suitable shifting means for placing the inlet of the additional conveyor into register with the outlet of either of the respective first and second conveyors. The shifting means can form part of the respective control means to ensure automatic shifting of the inlet of the additional conveyor in response to deactivation of the propelling unit which serves to deliver filter rod sections into one of the corresponding first and second conveyors and simultaneous activation of the propelling unit which serves to deliver filter rod sections to the inlet of the other of the associated first and second conveyors.

The junction can comprise several guide members at least one of which is movable between open and closed positions so as to afford access to the interior of the junction, e.g., for the purpose of cleaning or removal of jammed and/or damaged filter rod sections. Those portions of the first and second conveyors which are immediately adjacent to the junction, and at least a portion of the additional conveyor, are preferably located in a common plane, and the one guide member of the junction is preferably movable into such plane in order to assume its closed position.

The apparatus can comprise several junctions each of which connects a conveyor receiving filter rod sections from a propelling unit of the first pneumatic sender with a conveyor receiving filter rod sections from an additional propelling unit, preferably a propelling unit forming part of the second pneumatic sender.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 8b is a similar schematic plan view of a production line with two processing machines and four junctions in a distribution similar to that shown in FIG. 8a;

DESCRIPTION OF THE PREFERRED EMBODIMENTS

Figure 1:
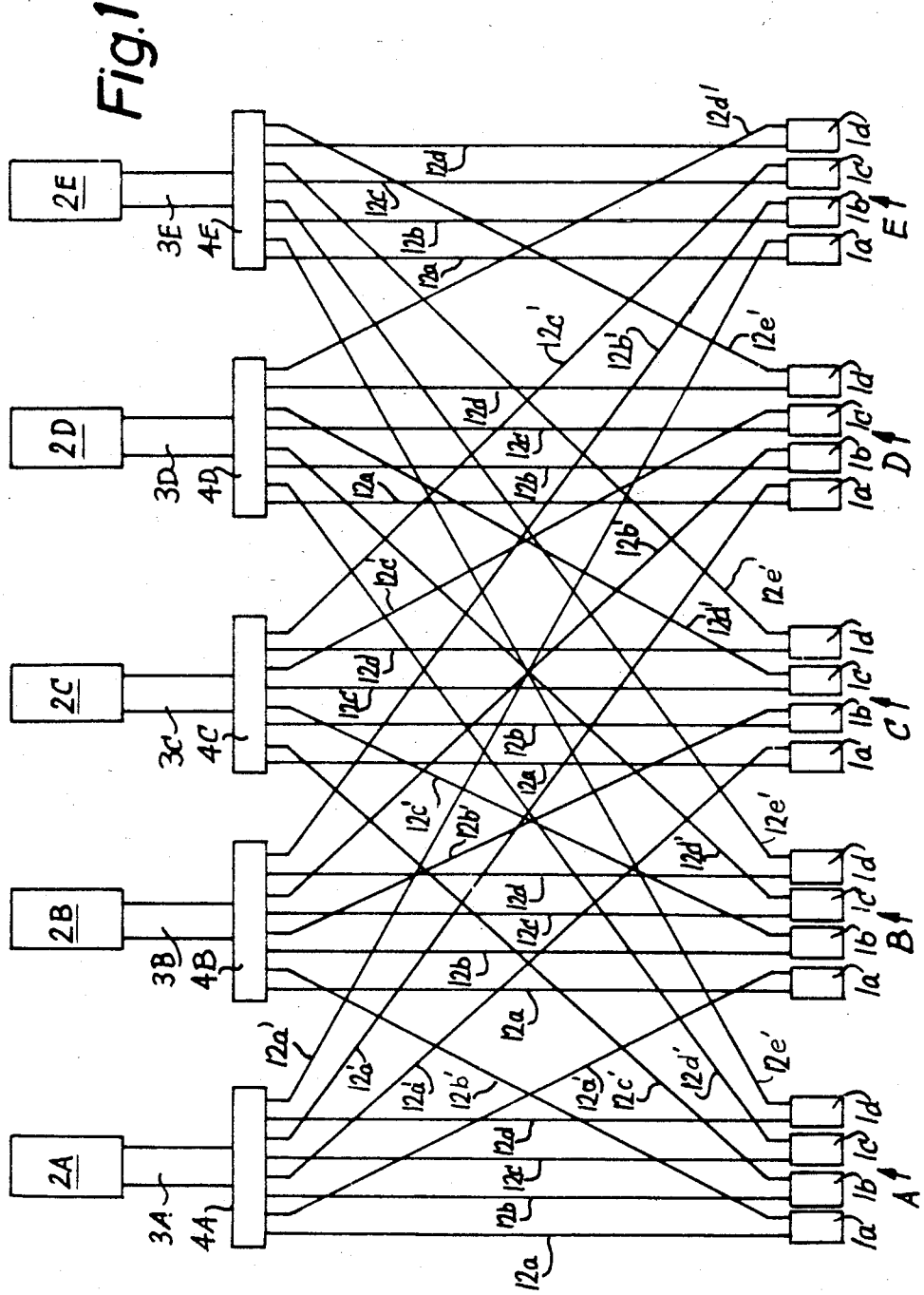
FIG. 1 is a schematic plan view of a battery of production lines each of which includes a filter tipping machine and an apparatus for delivery of filter rod sections to the magazine of the filter tipping machine.

FIG. 1 shows schematically a plant which produces filter cigarettes and includes five groups A, B, C, D and E of four filter tipping machines $1a$, $1b$, $1c$, $1d$ each, i.e., a total of twenty filter tipping machines. The plant comprises five filter rod making machines or filter makers 2A, 2B, 2C, 2D and 2E each of which can deliver filter rod sections of requisite length (e.g., six times unit length) to all four filter tipping machines $1a-1d$ of one of the groups A-E as well as to one selected filter tipping machine $1a$ or $1b$ or $1c$ or $1d$ of each other group. As shown in FIG. 1, the filter rod making machines 2A-2E respectively deliver filter rod sections to five discrete reservoir systems 3A, 3B, 3C, 3D and 3E, and these reservoir systems respectively deliver filter rod sections to five discrete pneumatic senders 4A, 4B, 4C, 4D and 4E. Each of the five senders 4A-4E has eight propelling units 9 (see FIGS. 2 and 3) which are connected with selected filter tipping machines by eight pneumatic conveyors including those denoted by reference characters $12a$, $12b$, $12c$, $12d$ plus four additional pneumatic conveyors respectively denoted by the reference characters $12a'$, $12b'$, $12c'$, $12d'$ and $12e'$. As shown, the first, third, fifth and seventh propelling units 9 of the first pneumatic sender 4A are respectively connected with the filter tipping machines $1a$, $1b$, $1c$, $1d$ of the first group A by the four leftmost pneumatic conveyors $12a$, $12b$, $12c$ and $12d$, and the second, fourth, sixth and eighth propelling units 9 of the pneumatic sender 4A are respectively connected with the filter tipping machine $1a$ of the group B, with the filter tipping machine $1a$ of the group C, with the filter tipping machine $1a$ of the group D and with the filter tipping machine $1a$ of the group E by the corresponding pneumatic conveyors $12a'$. Analogously, the first, third, fifth and seventh propelling units 9 of the pneumatic sender 4B are respectively connected with the machines $1a$, $1b$, $1c$, $1d$ of the second group B by the second set of pneumatic conveyors $12a-12d$ (as viewed in a direction from the left to the right in FIG. 1), and the second, fourth, sixth and eighth propelling units 9 of the sender 4B are respectively connected with the filter tipping machines $1a$, $1b$, $1b$ and $1b$ of the groups A, C, D and E by the corresponding pneumatic conveyors $12b'$. The first, third, fifth and seventh propelling units 9 of the pneumatic sender 4C are respectively connected with the machines $1a$, $1b$, $1c$, $1d$ of the group C by the third set of pneumatic conveyors $12a-12d$, and the second, fourth, sixth and eighth propelling units 9 of the sender 4C are respectively connected with the filter tipping machines $1b$, $1b$, $1c$ and $1c$ of the groups A, B, D and E by the corresponding pneumatic conveyors $12c'$. The first, third, fifth and seventh propelling units 9 of the sender 4D are respectively connected with the machines $1a$, $1b$, $1c$, $1d$ of the group D by the fourth set of pneumatic conveyors $1a-1d$, and the second, fourth, sixth and eighth propelling units 9 of the sender 4D are respectively connected with the machines $1c$, $1c$, $1c$ and $1d$ of the groups A, B, C and E by the corresponding pneumatic conveyors $12d'$. The first, third, fifth and seventh propelling units 9 of the pneumatic sender 4E are respectively connected with the machines $1a$, $1b$, $1c$, $1d$ of the group E by the fifth set of pneumatic conveyors $1a-1d$, and the second, fourth, sixth and eighth propelling units 9 of the sender 4E are respectively connected with the machines 1d of the groups A, B, C and D by the corresponding pneumatic conveyors 12e'.

The filter rod making machines 2A to 2E may be of the type known as KDF produced by Hauni-Werke Körber & Co. KG, Hamburg, Federal Republic Germany, the assignee of the present application. The reservoir systems 3A to 3E may be of the type known as RESY, also produced by the assignee of the present application; the pneumatic senders 4A to 4E may be of the type known as Filtromat, also produced by the assignee of the present application; and the filter tipping machines 1a to 1d in each of the five groups A to E may be of the type known as MAX or MAX S, also produced by the assignee of the present application.

Figure 2:
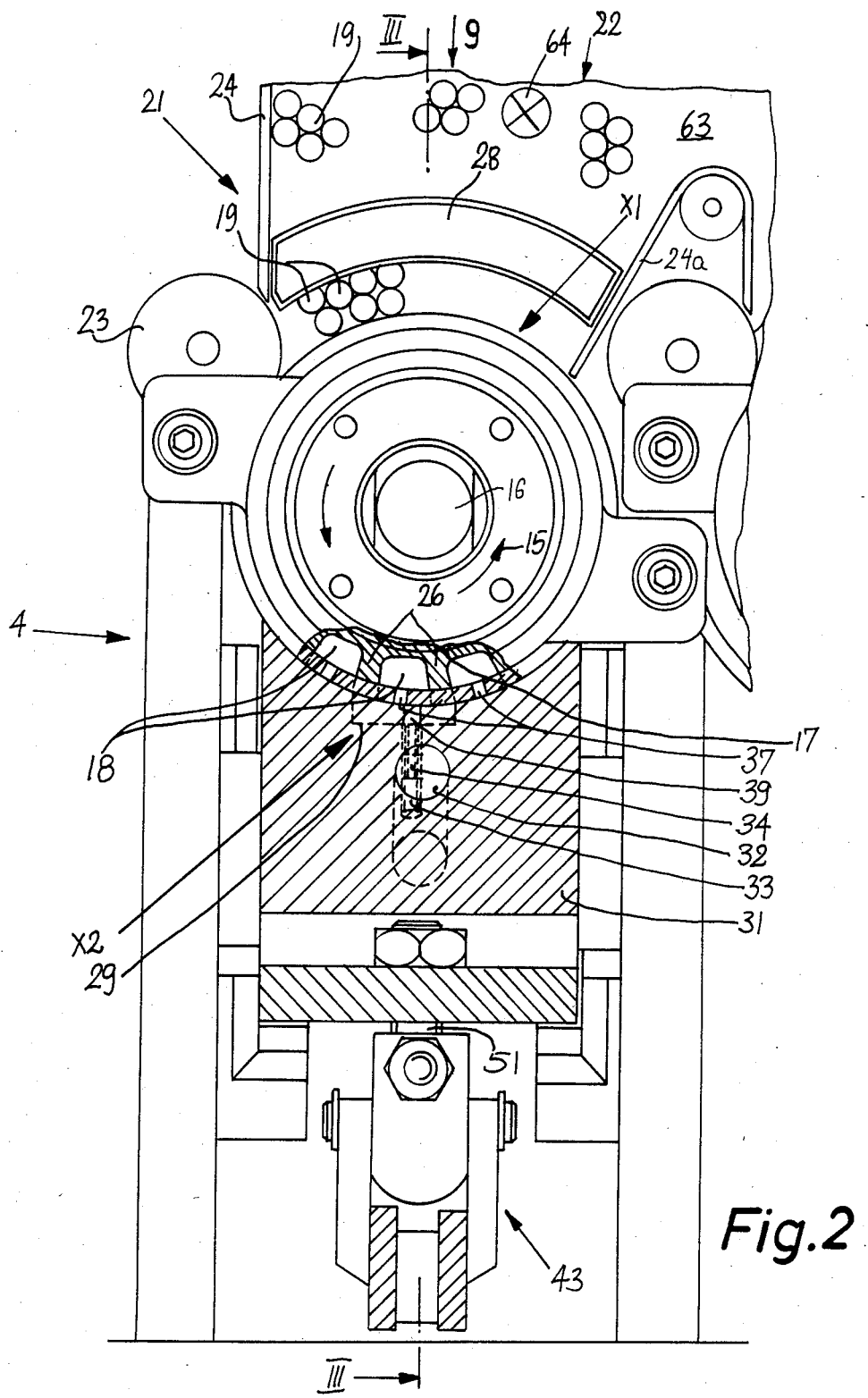
FIG. 2 is an enlarged transverse sectional view of a propelling unit for filter rod sections which is designed to deliver a file of filter rod sections to one of two pneumatic conveyors serving to transport filter rod sections to the magazine of a filter tipping machine, the section of FIG. 2 being taken in the direction of arrows as seen from the line II—II of FIG. 3.
Figure 3:
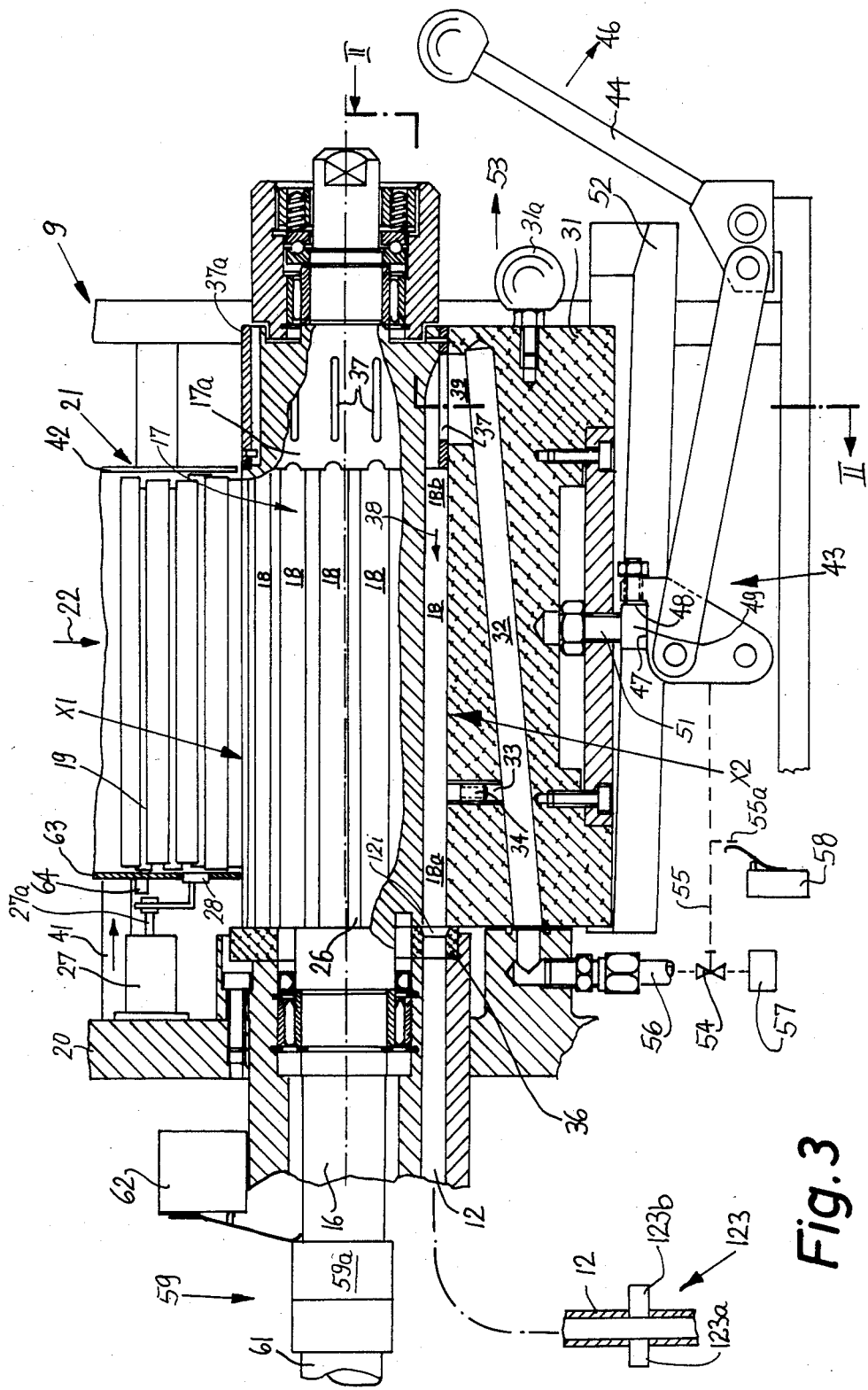
FIG. 3 is a smaller-scale central vertical sectional view of the propelling unit, substantially as seen in the direction of arrows from the line III—III of FIG. 2.

Each of the pneumatic senders 4A to 4E comprises eight discrete filter rod section propelling units 9 one of which is shown in detail in FIGS. 2 and 3. Furthermore, each of the filter tipping machines 1a to 1d in each of the five groups A to E is associated with two discrete filter rod receiving units 11 and 11' (see FIG. 4) which have means for accepting filter rod sections 19 from the respective propelling units 9 and further include means for feeding the thus accepted filter rod sections 19 into the magazine 66 of the respective filter tipping machine 1a, 1b, 1c or 1d. The arrangement may be such that the pneumatic conveyors 12a–12d which receive filter rod sections 19 from the sender 4A deliver such sections to the receiving units 11 for the four filter tipping machines 1a–1d in the group A, and the leftmost pneumatic conveyors 12b', 12c', 12d', 12e' respectively deliver filter rod sections 19 from the corresponding propelling units 9 of the pneumatic senders 4B, 4C, 4D, 4E to the receiving units 11' for the machines 1a, 1b, 1c, 1d of the group A. Analogously, the pneumatic conveyors 12a–12d which connect four propelling units 9 of the pneumatic sender 4B with the filter tipping machines of the group B deliver filter rod sections 19 to the receiving units 11 for the corresponding machines 1a, 1b, 1c, 1d in the group B, and the receiving units 11' for the machines 1a, 1b, 1c, 1d in the group B respectively receive filter rod sections 19 from the leftmost pneumatic conveyor 12a', from the second leftmost conveyor 12c', from the second leftmost conveyor 12d' and from the second leftmost conveyor 12e'. The receiving units 11 for the filter tipping machines 1a–1d in the group C receive filter rod sections 19 from the propelling units 9 of the sender 4C via corresponding set of pneumatic conveyors 12a–12d, and the receiving units 11' for the machines 1a, 1b, 1c, 1d in the group C respectively receive filter rod sections 19 from the second leftmost conveyor 12a', from the second leftmost conveyor 12b', from the third leftmost conveyor 12d' and from the third leftmost conveyor 12e'. The receiving units 11 for the filter tipping machines 1a–1d in the group D receive filter rod sections 19 from those propelling units 9 in the sender 4D which deliver such sections to the corresponding set of pneumatic conveyors 12a–12d, and the receiving units 11' for the machines 1a, 1b, 1c, 1d in the group D respectively receive filter rod sections 19 via the third leftmost conveyor 12a', the third leftmost conveyor 12b', the third leftmost conveyor 12c' and the rightmost conveyor 12e'. Finally, the receiving units 11 for the filter tipping machines 1a–1d in the group E receive filter rod sections 19 from those propelling units 9 in the sender 4E which supply filter rod sections to the corresponding set of pneumatic conveyors 12a–12e, and the receiving units 11' for the machines 1a, 1b, 1c, 1d in the group E respectively receive filter rod sections from the rightmost pneumatic ronveyor 12a', rightmost pneumatic conveyor 12b', rightmost pneumatic conveyor 12c' and rightmost pneumatic conveyor 12d'.

One of the total of forty propelling units 9 is illustrated in FIGS. 2 and 3. The construction of these propelling units is similar to that of the propelling unit which is disclosed in commonly owned U.S. Pat. No. 3,827,757 granted Aug. 6, 1974 to Bob Heitmann et al. The disclosure of this U.S. patent is incorporated herein by reference.

FIGS. 2 and 3 show a propelling unit 9 which comprises a shaft 16 serving to transmit torque to a drum 17 having peripheral flutes 18 which are separated from each other by axially parallel ribs or webs 26. The shaft 16 drives the drum 17 at a constant speed and receives torque from a main shaft 61 through the medium of a safety clutch 59. The flutes 18 of the drum 17 receive filter rod sections 19 from a supply 22 which is stored in a source here shown as a hopper 21 receiving filter rod sections from the outlet (not specifically shown) of the corresponding reservoir system 3A, 3B, 3C, 3D or 3E. The supply 22 contains parallel filter rod sections 19, and such filter rod sections are allowed to descend by gravity and to enter the oncoming flutes 18 in a region X1 substantially between the 10½ and 1½ o'clock positions of the drum 17, as viewed in FIG. 2. A roller 23, which is driven by the shaft 16 (or directly by the main shaft 61) in a manner not specifically shown in the drawing, serves to agitate the adjacent portion of the supply 22 as well as to prevent jamming and damage to filter rod sections 19 in the zone where the flutes 18 move beyond the hopper 21. The drum 17 is driven to rotate in a counterclockwise direction (arrow 15), as viewed in FIG. 2.

The means for interrupting the transfer of filter rod sections 19 from the hopper 21 into the flutes 18 of the drum 17 comprises an elastic intercepting member 28 which is reciprocable in the hopper 21 in the axial direction of the filter rod sections 19 and is connected to the reciprocable armature 27a of an electromagnet 27. The latter is installed in the frame 20 of the respective pneumatic sender 4A, 4B, 4C, 4D or 4E and is energizable by an amplifier (FIG. 6) to thereby move its armature 27a in the direction of arrow 41 shown in FIG. 3, whereby the elastic member 28 (e.g., a flap made of rubber or the like) engages the adjacent end faces of one or more layers of filter rod sections 19 in the hopper 21 and urges the other end faces of such layer or layers against a rear end wall 42 of the hopper 21. The electromagnet 27 and the intercepting member 28 are adjacent to the front end wall 63 of the hopper 21. FIG. 2 shows that the intercepting member 28 can have an arcuate shape with a center of curvature on the axis of the shaft 16, and that the width of this intercepting member can be selected with a view to ensure that the member 28 can engage the end faces of two layers of filter rod sections 19 in the hopper 21. FIG. 3 shows the intercepting member 28 in the retracted or idle position in which the filter rod sections 19 are free to descend toward and into the flutes 18 of the rotating drum 17 while the flutes 18 advance below the region X1. This region is bounded by a stationary wall 24 of the hopper 21 and by an endless belt 24a.

Those filter rod sections 19 which enter the incoming flutes 18 of the drum 17 are transported from the region X1 to a region X2 where they leave the respective flutes 18 to be introduced into the corresponding pneumatic conveyor (shown at 12 in FIG. 3). The illustrated pneumatic conveyor 12 can constitute any one of the five sets of pneumatic conveyors 12a–12d, any one of the four conveyors 12a', any one of the four conveyors 12b', any one of the four conveyors 12c', any one of the four conveyors 12d' or any one of the four conveyors 12e'.

Each filter rod section 19 which is transferred from the region X1 to the region X2 moves sideways (i.e., transversely of its longitudinal axis), and each filter rod section 19 which has entered the region X2 and is propelled into and caused to move in the associated pneumatic conveyor (12 of FIG. 3) advances axially or lengthwise.

Prior to moving into register with the inlet 12i of the pneumatic conveyor 12 shown in FIG. 3, a filter rod section 19 and the corresponding flute 18 of the drum 17 move into register with a relatively wide cutout or recess 29 which is machined into the concave upper side or surface of a sealing shoe 31 and serves to admit a compressed gas (preferably air) from a source 57 of compressed gas, through a valve 54, a conduit 56, a sloping channel 32 in the shoe 31, a bore 33 which contains a preferably adjustable flow restrictor 34, and into the oncoming flute 18. The thus admitted compressed gas flows around the filter rod section 19 in the flute 18 which registers with the recess 29; therefore, the pressure of gas in the front portion 18a of such flute (the front portion 18a is then adjacent to a sealing disc 36 which engages the front end face of the sealing shoe 31 and has an aperture in register with the bore of the pneumatic conveyor 12) is the same as the pressure in the rear portion 18b of the same flute. This is due to the fact that the rear portion 18b communicates with the channel 32 of the sealing shoe 31 by way of a slot 37 which is machined into a cylinder 37a surrounding the smaller-diameter rear portion 17a of the drum 17. This ensures that the filter rod section 19 in a flute 18 which moves into register with the recess 29 is not abruptly propelled counter to the direction which is indicated by the arrow 38 when the bore 33 admits compressed gas into the front end portion 18a of such flute and especially when the flute 18 moves into register with the pneumatic conduit 12 wherein the pressure of gas exceeds atmospheric pressure (it is assumed that the filter rod sections 19 in the pneumatic conveyors are transported by compressed gas rather than under the action of suction). When a flute 18 which contains a filter rod section 19 moves into full register with the inlet 12i of the pneumatic conveyor 12, the rear end portion 18b of such flute receives highly comprssed gas (normally air) through a pipe or conduit 39 which causes highly compressed gas to enter the rear end portion 18b by way of the respective slot 37 so that the filter rod section 19 is abruptly propelled into the conveyor 12 before the angular movement of the drum 17 could cause a shearing of or other damage to the filter rod section. The arrow 38 indicates the direction of abrupt (practically instantaneous) transfer of a filter rod section 19 from the corresponding flute 18 into the pneumatic conveyor 12. The connection between the outlet of the pipe 39 and the flute 18 which has moved beyond the position of register with the conveyor 12 is interrupted in automatic response to further rotation of the drum 17. In order to facilitate entry of the leader of a filter rod section 19 into the pneumatic conveyor 12, the inlet 12i of this conveyor preferably flares outwardly and rearwardly, i.e., toward the front end face of the sealing shoe 31.

The same procedure is repeated as the drum 17 continues to rotate and moves successive filled flutes 18 into register first with the recess 29 of the sealing shoe 31 and thereupon into register with the inlet 12i of the pneumatic conveyor 12.

When the electromagnet 27 is deenergized, a spring (not shown) moves its armature 27a in the direction of the arrow 41 so that the intercepting member 28 engages one or more adjacent layers of filter rod sections 19 and cooperates with the rear end wall 42 to prevent further advancement of filter rod sections from the hopper 21 into the flutes 18 of the drum 17. The drum 17 merely removes those filter rod sections 19 which are located at a level below the lower edge portion of the intercepting member 28 when the electromagnet 27 is deenergized. The drum 17 can continue to rotate with the shaft 16 but the conveyor 12 ceases to receive filter rod sections 19 until after the electromagnet 27 is energized again so as to move the intercepting member 28 counter to the direction which is indicated by the arrow 41 so that the lowermost layers of the supply 22 can descend into the region X1 and the flutes 18 again deliver discrete filter rod sections 19 into the region X2, i.e., toward the positions of alinement with the inlet 12i of the pneumatic conveyor 12.

The sealing block 31 is urged against the drum 17 by a bell crank lever 43 which is pivotable by a manually operable lever 44. When an attendant pivots the lever 44 in the direction of the arrow 46, the surfaces 47 and 48 of the bell crank lever 43 are moved away from the adjacent surfaces of an adjustable pressure transmitting member 51 which is a bolt or screw having a head 49 engageable by the surfaces 47 and 48. The sealing block 31 is then free to descend and to come to rest on a stationary support 52. The attendant is then in a position to withdraw the sealing block 31 in the direction of arrow 53 by engaging the handle 31a. Such removability of the sealing block 31 is of advantage because it allows for cleaning of the flutes 18 as well as for removal of filter rod sections 19 which happen to be squashed or otherwise damaged or totally destroyed during or preparatory to transfer from the flutes 18 into the pneumatic conveyor 12. Furthermore, such removability of the sealing block 31 renders it possible to allow for convenient cleaning of the channel 32, bore 33, flow restrictor 34 and/or that surface of the block 31 which is normally in sealing engagement with the lower portion of the drum 17.

When the lever 44 is pivoted in the direction of the arrow 46, the bell crank lever 43 automatically closes the valve 54 by way of an operative connection 55 which is indicated by broken lines. The valve 54 is installed in the conduit 56 and interrupts the flow of compressed gas from the source 57 to the channel 32 when the sealing block 31 is disengaged from the drum 17 and/or when the sealing block 31 is removed from the propelling unit 9 of FIGS. 2 and 3. The operative connection 55 has a trip 55a which actuates a signal generator 58 (e.g., a limit switch) when the valve 54 is closed so as to enable the signal generator 58 to transmit a signal for the purposes to be described in connection with FIG. 6.

The aforementioned clutch 59 between the shafts 16 and 61 is disengaged when a squashed filter rod section 19 is caught between the sealing block 31 and the drum 17. Disengagement of the clutch 59 entails a movement of the clutch element 59a in a direction to the right, as viewed in FIG. 3, whereby the clutch element 59a actuates a signal generator 62, e.g., a limit switch. The signal generator 62 transmits a signal which denotes that the shaft 16 is idle, i.e., that the drum 17 does not transport filter rod sections 19 from the region X1 to the region X2. The shaft 61 receives torque from the prime mover of the respective pneumatic sender 4A, 4B, 4C, 4D or 4E.

The level of the upper surface of the supply 22 of filter rod sections 19 in the hopper 21 is monitored by a signal generating photoelectric detector 64 which may constitute a reflection type photocell. The detector 64 is mounted on the front end wall 63 of the hopper 21 and the light beam which issues from its light source can reach the associated transducer when the upper surface of the supply 22 sinks below a predetermined minimum acceptable level. In other words, the detector 64 transmits a signal whenever the light beam which is emitted by its light source is not reflected by the end face or end faces of one or more filter rod sections 19 in the hopper 21.

Figure 4:
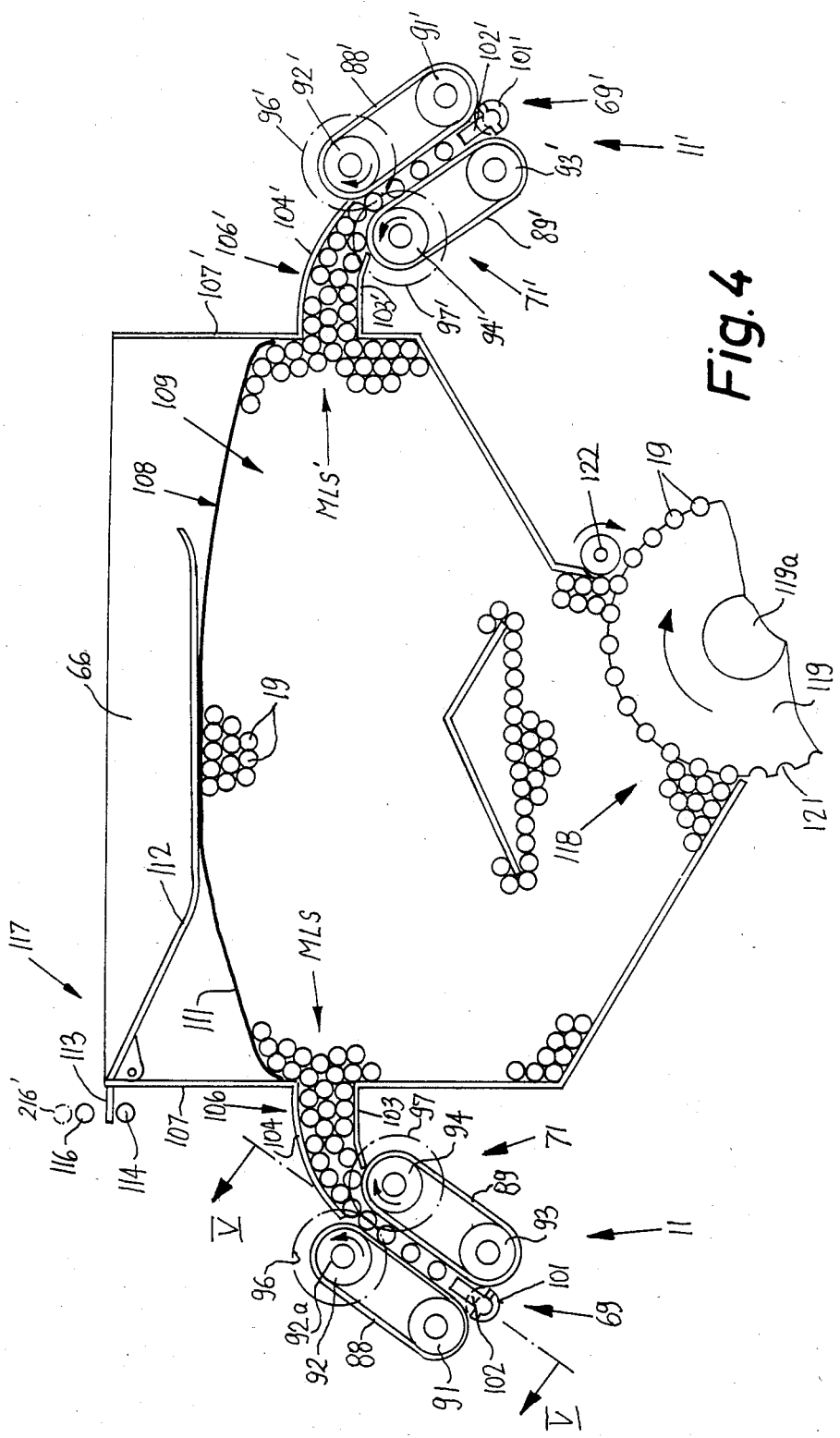
FIG. 4 is a schematic front elevational view of the magazine of one of the twenty filter tipping machines in the battery of production lines shown in FIG. 1.

FIG. 4 shows the magazine 66 of one of the twenty filter tipping machines (1a, 1b, 1c or 1d in the group A, B, C, D or E). Each magazine 66 can receive discrete multi-layer streams MLS and MLS' of filter rod sections 19 from two receiving units 11 and 11' which are disposed at the opposite sides of the magazine. Since the construction of the receiving unit 11 is identical with that of the receiving unit 11', the component parts of the two receiving units are denoted by similar reference characters except that the characters denoting the parts of the receiving unit 11' are followed by primes.

Figure 5:
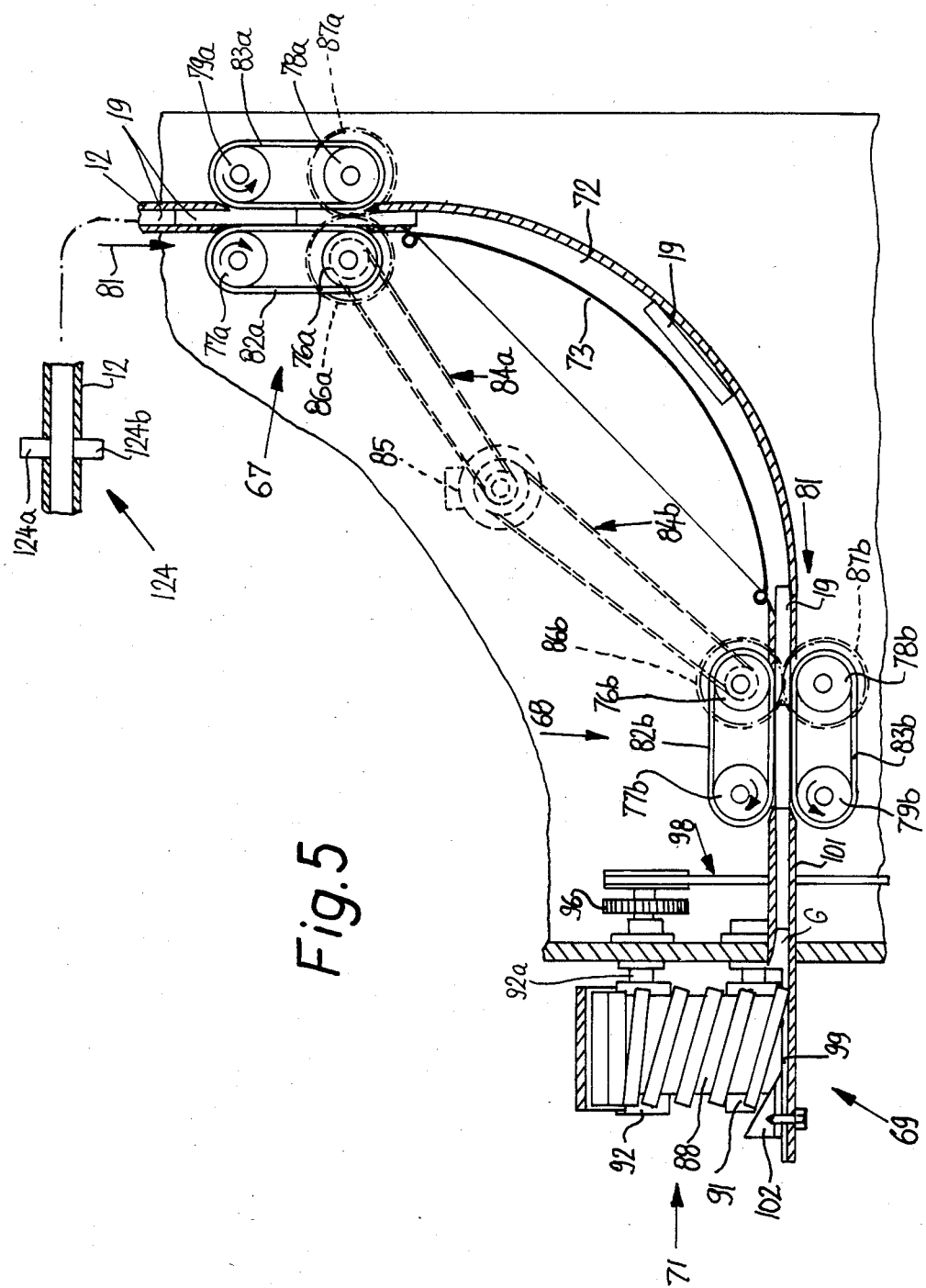
FIG. 5 is an enlarged sectional view as seen in the direction of arrows from the line V—V of FIG. 4 and shows a unit which receives a file of filter rod sections from a pneumatic conveyor and converts the file into a multi-layer stream prior to forcible introduction into the magazine of a filter tipping machine.

The receiving unit 11 comprises a speed uniformizing or equalizing accepting conveyor 67 (see FIG. 5) which serves to accept and advance filter rod sections 19 issuing from the outlet of the pneumatic conveyor 12 (it being assumed that the receiving unit 11 is disposed at the discharge end of the pneumatic conveyor whose inlet 12i is illustrated in the left-hand portion of FIG. 3). The accepting conveyor 67 is designed to advance, at a predetermined speed, successive filter rod sections 19 of the file of such sections issuing from the pneumatic conveyor 12. The thus accepted filter rod sections 19 of the file enter an accelerating device 68 which is shown in FIG. 5 and serves to increase the speed of successive foremost filter rod sections 19 of the file so as to ensure that the sections 19 which advance beyond the accelerating device 68 are separated from each other by gaps G of given width, namely, of a width which is sufficient to prevent a next-following section 19 from interfering with a change in the direction of movement of the preceding section 19. The accelerating device 68 of the receiving unit 11 is followed by a deflecting or reorienting device 69 which causes successive oncoming filter rod sections 19 of the file to move sideways (the sections 19 advance by moving axially or lengthwise through the pneumatic conveyor 12, through the speed equalizing accepting conveyor 67, an arcuate U-shaped guide 72 between the accepting conveyor 67 and the accelerating device 68 and toward the deflecting device 69) toward and into the supply 109 of filter rod sections 19 in the magazine 66. The deflecting device 69 is followed by a device 71 for forcible feeding of filter rod sections 19 (which move sideways) into the interior of the magazine 66 at a level below the upper surface 108 of the supply 109 of filter rod sections therein.

The open side of the arcuate U-shaped guide 72 between the accepting conveyor 67 and the accelerating device 68 is overlapped by a flexible panel or lid 73 of springy sheet metal or the like. The guide 72 also constitutes a direction changing or reorienting device; however, whereas the deflecting device 69 changes the direction of movement of successive accelerated filter rod sections 19 from axial movement to sidewise or transverse movement, the guide 72 merely changes the direction of axial or lengthwise movement of the non-accelerated filter rod sections 19 through a given angle, e.g., through approximately 90 degrees so that the filter rod sections 19 which move downwardly on leaving the accepting conveyor 67 move horizontally during entry into the accelerating device 68. An advantage of the guide 72 and its cover 73 is that the direction of axial movement of successive filter rod sections 19 can be changed in a very small area and without defacing and-/or otherwise damaging the filter rod sections.

The construction of the speed equalizing accepting conveyor 67 is practically identical with that of the accelerating device 68. The only difference is that the device 68 advances the oncoming filter rod sections 19 at a speed which is higher than the speed of lengthwise movement of filter rod sections 19 which leave the conveyor 67. The reference characters denoting the parts of the speed equalizing accepting conveyor 67 are followed by the letter a, and the reference characters which denote parts of the accelerating device 68 (such parts are identical with the corresponding parts of the conveyor 67) are followed by the letter b. As shown in FIG. 5, the accepting conveyor 67 comprises four pulleys 76a, 77a, 78a and 79a. The pulleys 76a, 77a are located at one side of the path of movement of filter rod sections 19 from the outlet of the pneumatic conveyor 12 toward the guide 72, and the pulleys 78a, 79a are located at the other side of such path. The direction in which successive filter rod sections 19 enter the conveyor 67 and thereupon the accelerating device 68 is indicated by arrows 81. A first endless belt 82a is trained over the pulleys 76a, 77a, and a second endless belt 83a is trained over the pulleys 78a, 79a. The parallel neighboring portions or reaches of the belts 82a, 83a travel downwardly, as viewed in FIG. 5, and the distance between such reaches at most equals the diameter of a filter rod section 19 so that a filter rod section which enters the space between these belts is compelled to advance at the exact speed of the belts on its way toward and into the guide 72. The belts 82a, 83a can accelerate or decelerate successive filter rod sections 19 (or selected filter rod sections), depending upon the speed at which the filter rod sections leave the outlet of the pneumatic conveyor 12. In order to ensure that the speed of the belt 82a invariably matches the speed of the belt 83a, the speed equalizing accepting conveyor 67 further comprises two mating gears 86a, 87a which are respectively coaxial with the pulleys 76a, 78a and have identical diameters as well as identical numbers of teeth. A prime mover 85 which is installed in, on or adjacent to, the frame of the filter tipping machine including the magazine 66 of FIG. 5 drives the pulley 76a and the gear 86a through the medium of an endless belt 84a whereby the gear 86a drives the gear 87a and pulley 78a. The pulleys 76a, 78a respectively drive the belts 82a, 83a which, in turn, drive the pulleys 77a, 79a. It is clear that the pulleys 76a–79a can be replaced with sprocket wheels or gears if the belts 82a, 83a are replaced with chains or toothed belts.

The endless belt 84b which is driven by the prime mover 85 (e.g., a variable-speed electric motor) and drives the pulley 76b and gear 86b of the accelerating device 68 causes the belts 82b and 83b to travel at a speed which is higher than the speed of the belts 82a, 83a. This ensures that, if not separated ahead of the accelerating device 68, successive filter rod sections 19 are separated from each other by gaps G of requisite width not later than in the region between the accelerating device 68 and the deflecting device 69.

The deflecting device 69 of the receiving unit 11 cooperates with two endless belts 88 and 89 which are best shown in FIG. 4. The belts 88, 89 form part of the device 71 and serve to forcibly feed successive filter rod sections 19 into the magazine 66. The positions of the belts 88 and 89 are selected in such a way that they move successive filter rod sections 19 sideways, i.e., a single file of sections 19 which advance toward, through and beyond the accelerating device 68 is converted into at least one row of filter rod sections which move sideways upwardly toward and into the interior of the magazine 66. The belts 88 and 89 are respectively trained over pulleys 91, 92 and 93, 94 and the pulleys 92, 94 are respectively coaxial with mating gears 96, 97 which ensure that the speed of the belt 88 invariably matches the speed of the belt 89. The shaft 92a of the pulley 92 is driven by a variable-speed electric motor or another suitable prime mover whereby the shaft 92a drives the pulley 92 and gear 96 (see FIG. 5) and these parts respectively drive the belt 88 and the parts 94, 97, 89. The belts 88, 89 respectively drive the pulleys 91 and 93. The distance between the parallel inner portions or reaches of the belts 88, 89 at most equals the diameter of a filter rod section 19 so that the filter rod sections which move sideways upwardly and away from the accelerating device 68 are positively entrained and forcibly introduced into the supply 109 which is confined in the interior of the magazine 66.

A plate-like or trough-shaped guide 99 of the deflecting device 69 is disposed between the accelerating device 68 and the lower end turns of the belts 88 and 89. The discharge end of the guide 99 carries or contains a wedge-like deflecting element 102 whose upwardly inclined surface lifts the leaders of successive filter rod sections 19 so that such leaders enter the space between the inner reaches of the belts 88, 89 and are caused to move upwardly as shown in the left-hand portion of FIG. 5. The reference character 101 denotes a tubular guide member which is interposed between the pulleys 77b, 79b of the accelerating device 68 and the guide 99 of the deflecting device 69. The motion transmitting connection between the aforementioned (non-illustrated) motor and the shaft 92a comprises an endless belt or chain transmission 98 shown in FIG. 5.

The single row of filter rod sections 19 which reach the upper end turns of belts 88, 89 is converted into the multi-layer stream MLS which advances through a funnel 106 including stationary lower and upper arcuate walls 103, 104 and into the interior of the magazine 66. The walls 103, 104 are integral with or connected to the adjacent side wall 107 of the magazine 66; the side wall 107 has an opening of appropriate size and shape to allow for entry of the multi-layer stream MLS into the interior of the magazine, i.e., into the supply 109.

The operation of the receiving unit 11 is as follows:

The pneumatic conveyor 12 delivers filter rod sections 19 to the speed equalizing accepting conveyor 67 wherein the sections are engaged by the parallel inner reaches of the belts 82a, 83a so that the speed of each and every filter rod section 19 advancing beyond the conveyor 67 (i.e., into the guide 72) matches a predetermined speed. The guide 72 directs successive filter rod sections 19 into the accelerating device 68 (the speed of successive filter rod sections which reach the belts 82b, 83b of the accelerating device 68 also matches a predetermined speed because the speed of all sections 19 leaving the conveyor 67 is identical and the friction between successive sections 19 and the surfaces of the guide 72 and/or cover 73 is constant). The belts 82b and 83b positively engage and propel successive filter rod sections 19 into the guide member 101 whereupon successive sections 19 advance in the trough-shaped guide 99 to reach the wedge-like deflecting element 102 which lifts the leading ends of such filter rod sections so that they can be engaged and entrained by the endless belts 88, 89 of the feeding device 71. The direction of movement of successive filter rod sections 19 is changed from axial to sidewise movement on entry between the parallel inner reaches of the belts 88 and 89. The leader of an oncoming filter rod section 19 (namely, of a section which advances in the guide member 101 and along the rear portion of the trough-shaped guide 99) cannot interfere with conversion of lengthwise movement into sidewise movement of the preceding section 19 because the difference between the speeds of the belts 82a, 83a on the one hand and the speed of the belts 82b, 83b on the other hand suffices to entail the formation of gaps G of requisite width. The funnel 106 including the stationary walls 103, 104 converts the single row of ascending filter rod sections 19 into the multi-layer stream MLS successive increments of which are forced into the interior of the magazine 66 at a level below the upper surface 108 of the supply 109. The layer MLS is forced into the magazine 66 by the belts 88, 89, i.e., by the single row of filter rod sections 19 which are forcibly introduced into the lower portion of the funnel 106 including the walls 103, 104.

The supply 109 of filter rod sections 19 in the magazine 66 is monitored by a sensor 112 which is pivotably mounted on the side wall 107 and has a projection 113 serving as a trip for a lower signal generator 114 or an upper signal generator 116. Each of these signal generators may constitute a proximity switch of any known design. The free end portion of the sensor 112 does not rest directly on the supply 109 but rather on a loosely mounted flexible cover 111 which reduces the likelihood of misalignment of filter rod sections 19 forming the supply 109 in the magazine 66. The sensor 112, its projection or trip 113 and the signal generators 114, 116 together constitutes a monitoring device 117 which generates signals when the upper surface 108 of the supply 109 rises above a predetermined upper level or drops below a predetermined lower level.

The bottom portion of the magazine 66 is formed with an outlet opening 118 which receives a portion of a fluted withdrawing or evacuating drum 119 mounted on a driven shaft 119a. The axially parallel peripheral flutes of the drum 119 are shown at 121; these flutes remove filter rod sections 19 from the interior of the magazine 66 for introduction into the filter tipping machine 1a, 1b, 1c or 1d proper. A filter tipping machine which can be used to process the filter rod sections 19 and can be equipped with a magazine 66 of FIG. 4 is disclosed, for example, in commonly owned U.S. Pat. No. 4,237,907 granted Dec. 9, 1980 to Pawelko et al. for "Apparatus for convoluting adhesive-coated uniting bands around groups of rod-shaped articles in filter tipping and like machines". The drum 119 may constitute a so-called severing conveyor which transports filter rod sections 19 sideways past two axially and circumferentially staggered rotary disc-shaped knives (not shown) serving to subdivide each filter rod section 19 into three filter plugs of double unit length. Such filter plugs are normally employed for the making of filter cigarettes of double unit length, e.g., in a manner as disclosed in the aforementioned U.S. Pat. No. 4,237,907.

An agitating roller 122 is adjacent to one side of the outlet opening 118 to prevent jamming of filter rod sections 19 in the region where successive freshly filled flutes 121 advance beyond the outlet opening. The direction of rotation of the roller 122 is the same as that of the drum 119. The right-hand side wall 107' of the magazine 66 shown in FIG. 4 is shortened so as to enable a portion of the roller 122 to agitate the contents of the magazine in the region immediately adjacent to the right-hand side of the outlet opening 118. The receiving unit 11' of FIG. 4 is mirror symmetrical to but otherwise identical with the receiving unit 11.

Figure 6:
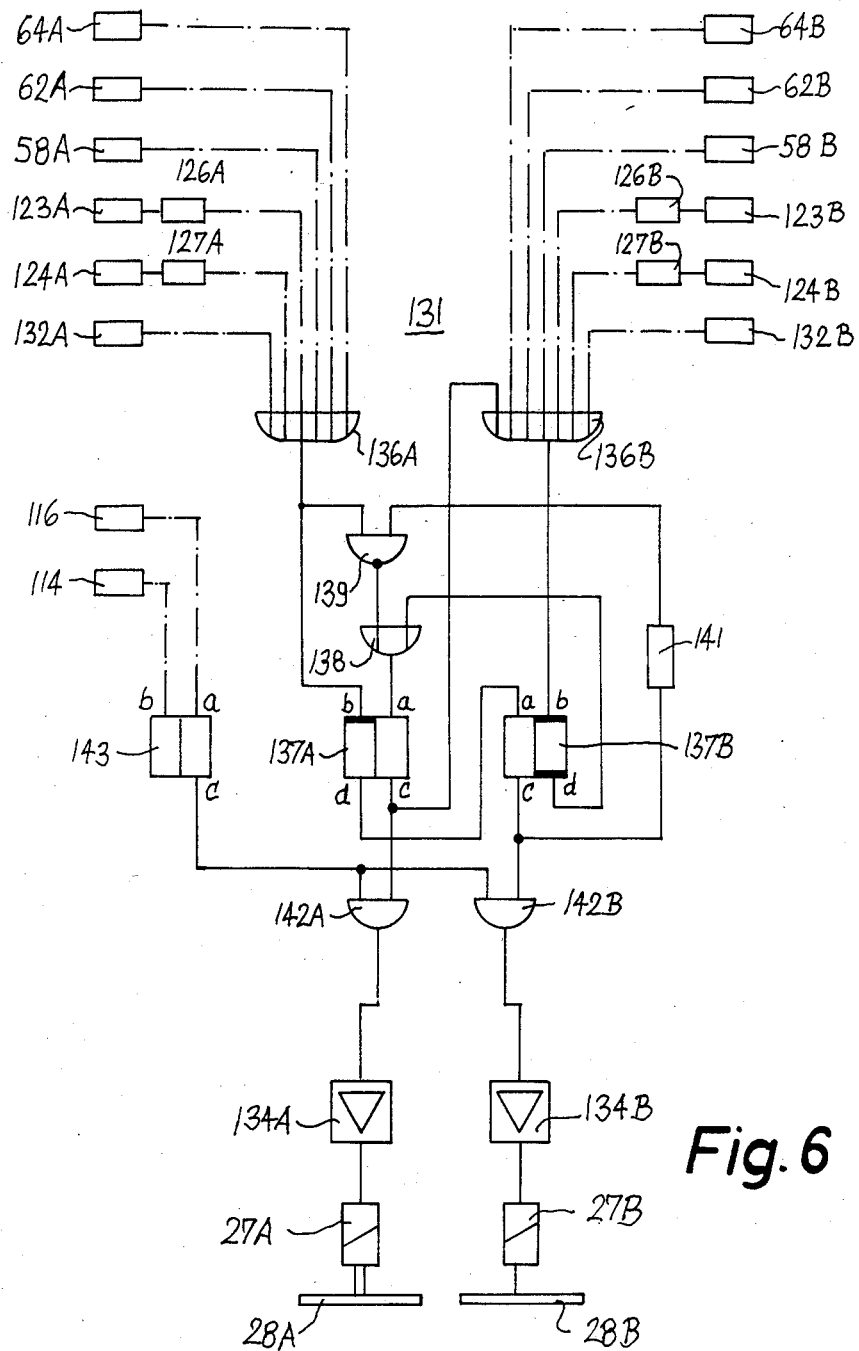
FIG. 6 is a circuit diagram of a control unit which regulates the delivery of filter rod sections to opposite sides of the supply of filter rod sections in the magazine shown in FIG. 4.

FIG. 5 shows that the outlet portion of the pneumatic conveyor 12 is equipped with a signal generator 124 which is located downstream of a similar signal generator 123 (see the left-hand portion of FIG. 3). The signal generator 123 includes a light source 123a and a photoelectronic transducer 123b which generates signals in response to detection of light rays emitted by the source 123a. Analogously, the signal generator 124 of FIG. 5 comprises a light source 124a and a transducer 124b. The signal generator 123 is activated whenever the corresponding propelling unit 9 is to deliver filter rod sections 19. For example, the signal generator 123 can be activated simultaneously with energization of the electromagnet 27, i.e., when the electromagnet 27 is caused to retract the elastic intercepting member 28 so that filter rod sections 19 of the supply 22 can descend into the region X1. The means for energizing the electromagnet 27 and for activating the signal generator 123 can be actuated by hand or in automatic response to a request signal. The connection between the energizing means and the signal generator 123 may comprise a simple AND gate. FIG. 6 shows that an electromagnet 27A corresponding to the electromagnet 27 can be energized by an amplifier 134A.

As shown in FIG. 6, the signal generators 123, 124 of each pneumatic conveyor are connected in series with discrete time delay units 126 and 127, e.g., time delay units of the type known as Sigmatronic and produced by the firm BBC. The time delay unit 126 transmits a signal in response to failure of the signal generator 123 to detect any filter rod sections 19 for a given (e.g., variable) interval of time, i.e., in response to failure of the propelling unit 9 of FIGS. 2 and 3 to deliver filter rod sections 19 into and beyond the inlet 12i of the pneumatic conveyor 12. On the other hand, the time delay unit 127 transmits a signal in response to continuous (uninterrupted) detection of filter rod sections 19 by the signal generator 124 for a given interval of time.

The manner in which the delivery of filter rod sections 19 from two discrete propelling units 9 (for example, from the leftmost propelling unit of the sender 4A shown in FIG. 1, via leftmost pneumatic conveyor 12a and to the left-hand receiving unit 11 of the magazine 66 in the leftmost filter tipping machine 1a of the group A as well as from the second leftmost propelling unit 9 of the sender 4B of FIG. 1, via leftmost pneumatic conveyor 12b' and the right-hand receiving unit 11' of the filter tipping machine 1a in the unit A of FIG. 1) to the corresponding receiving units of the associated filter tipping machine is illustrated in FIG. 6. The reference character 131 denotes the entire control unit. The structure of FIG. 1 comprises a total of twenty control units 131, one for each filter tipping machine. Those elements of the control unit 131 of FIG. 6 which serve to regulate the delivery of filter rod sections 19 to the receiving unit 11 of the leftmost machine 1a of FIG. 1 are identical with the elements which serve to regulate the delivery of filter rod sections to the receiving unit 11' of the same filter tipping machine. For the sake of convenient differentiation, the elements in the left-hand half of the control unit 131 are denoted by reference numerals each followed by the letter "A", and the elements in the right-hand half of the control unit 131 are denoted by identical reference numerals each of which is followed by the letter "B". Thus, the parts 58A, 62A, etc. regulate the delivery of filter rod sections 19 from the sender 4A to the receiving unit 11 of the leftmost filter tipping machine 1a, and the parts 58B, 62B, etc. regulate the delivery of filter rod sections 19 from the sender 4B to the receiving unit 11' of the same machine 1a. The outputs of the signal generators 58A, 62A, 64A are directly connected with the corresponding inputs of an OR gate 136A, and the outputs of the signal generators 123A, 124A are indirectly connected with the corresponding inputs of the OR gate 132A by way of the associated time delay units 126A, 127A. A second OR gate 136B is directly connected with the outputs of the signal generators 58B, 62B, 64B and is indirectly connected with the outputs of the signal generators 123B, 124B (by way of the time delay units 126B, 127B).

In addition to the signal generators 58A, 62A, 64A, 123A, 124A and 58B, 62B, 64B, 123B, 124B which were described and/or identified hereinabove, each control unit 131 further comprises two signal generators 132A and 132B, one for each of the two propelling units 9 cooperating with a given filter tipping machine 1a, 1b, 1c or 1d. The signal generators 132A and 132B are manually operated switches which can be actuated by an attendant to thereby deactivate the respective propelling units 9. As shown in FIG. 6, the signal generators 132A and 132B are directly connected with the corresponding inputs of the respective OR gates 136A and 136B whose outputs are connected with the dominant inputs b of two memories, namely a memory 137A and a memory 137B with system reset.

The input a of the memory 137A is connected with the output of an OR gate 138 one input of which is connected with the output d of the memory 137B and the other input of which is connected with the output of a NAND gate 139. One input of the NAND gate 139 is connected with the output of the OR gate 136A and its other input is connected with the output c of the memory 137B by way of a signal shortening or lengthening unit 141. The purpose of the unit 141 (whose construction is known per se) is to furnish a signal of desired (preferably variable) duration. Thus, if the duration of application of a signal to the input of the unit 141 is less than the desired duration of signal which is to be applied by the output of the unit 141, the latter prolongs the received signal. On the other hand, the duration of signal which is applied to the unit 141 may be excessive; the unit 141 then shortens the signal by interrupting the transmission of the received signal after elapse of a given interval of time.

The input a of the memory 137B is connected with the output d of the memory 137A and the outputs c of the memories 137A, 137B are respectively connected with the corresponding inputs of two AND gates 142A and 142B. The outputs of the AND gates 142A and 142B are respectively connected with the amplifiers 134A, 134B which control the electromagnets 27A, 27B for the intercepting members 28A and 28B. The second inputs of the AND gates 142A and 142B are connected with the output c of a memory 143 whose inputs a and b are respectively connected with the signal generators 116 and 114 of the monitoring device 117 shown in FIG. 4. The input b of the memory 143 is a resetting input.

The following description of operation of the control unit 131 applies also for the remaining nineteen units 131. As explained above, the illustrated unit 131 serves to control the operation of means for supplying filter rod sections 19 to the magazine 66 of the leftmost filter tipping machine 1a of the group A shown in FIG. 1. This machine can receive filter rod sections from the leftmost propelling unit 9 of the pneumatic sender 4A or from the next-to-the-leftmost propelling unit 9 of the pneumatic sender 4B. The connection between the sender 4A and the leftmost machine 1a of the group A includes the leftmost pneumatic conveyor 12a of FIG. 1, and the connection between the pneumatic sender 4B and the leftmost machine 1a of the group A includes the leftmost pneumatic conveyor 12b'.

It is assumed that the aforementioned leftmost and next-to-the-leftmost propelling units 9 of the pneumatic senders 4A and 4B are operative and that the corresponding filter rod making machines 2A and 2B turn out filter rods 19. The output d of the memory 137B with system reset transmits a signal to the corresponding input of the OR gate 138 which transmits the signal to the input a of the memory 137A. Therefore, the output c of the memory 137A transmits a signal to the corresponding input of the AND gate 142A. The latter transmits a signal to the amplifier 134A only when the upper level 108 of the supply 109 of filter rods 19 in the magazine 66 sinks to such an extent that the trip 113 of the sensor 112 actuates the signal generator 116 whose output transmits a signal to the input a of the memory 143. This causes the AND gate 142A to transmit a signal to the amplifier 134A which energizes the electromagnet 27A whereby the latter retracts the intercepting member 28A so that the propelling unit 9 of the sender 4A is free to supply filter rod sections 19 to the inlet of the pneumatic conveyor 12a connecting the leftmost propelling unit 9 of the sender 4A with the leftmost machine 1a of the group A shown in FIG. 1. FIG. 6 shows that the output c of the memory 143 then also transmits a signal to the corresponding input of the AND gate 142B. However, this does not result in energization of the electromagnet 27B because the other input of the AND 142B does not receive a signal from the output c of the memory 137B.

Since the conveyor 12a delivers filter rod sections 19 into the magazine 66 of the leftmost filter tipping machine 1a of FIG. 1, the upper level 108 of the supply 109 of filter rod sections in the magazine rises so that the cover 111 pivots the sensor 112 in a counterclockwise direction, as viewed in FIG. 4, whereby the trip 113 approaches and ultimately actuates the signal generator 114 which transmits a signal to the resetting input b of the memory 143 shown in the left-hand portion of FIG. 6. Therefore, the signal at the output of the AND gate 142A disappears and the amplifier 134A deenergizes the electromagnet 134A so that the intercepting member 28A can reassume its operative position and blocks further delivery of filter rod sections 19 into the range of the drum 17 in the respective propelling unit 9 of the pneumatic sender 4A.

The just described series of steps is repeated again and again as long as the just discussed propelling unit 9 of the pneumatic sender 4A remains operative. The situation changes if one of the signal generators 58A, 62A, 123A (via time delay unit 126A), 124A (via time delay unit 127A) and 132A transmits a signal to the corresponding input of the OR gate 136A. Thus, and as already explained hereinbefore, the signal generator 58A is activated in response to retraction of the sealing shoe 31 from the respective propelling unit 9, the signal generator 62A is actuated if the clutch 59 is disengaged as a result of jamming of a filter rod section 19 in the propelling unit 9, the signal generator 64A is actuated if the supply 22 of filter rods 19 in the hopper 19 is depleted, the signal generator 123A is actuated if the inlet of the pneumatic conveyor 12a ceases to receive filter rod sections 19 from the respective propelling unit 9, the signal generator 124A is actuated if the outlet portion of the pneumatic conveyor 12a piles up an excessive number of abutting filter rod sections 19 upstream of the accepting conveyor 67, and the signal generator 132A is actuated by hand when the attendant desires to arrest the respective propelling unit 9. The output of the OR gate 136A then transmits a signal to the resetting input b of the memory 137A so that the signal at the output c of the memory 137A disappears. At the same time, the output d of the memory 137A transmits a signal to the input a of the memory 137B. Disappearance of a signal at the output c of the memory 137A results in deenergization of the electromagnet 27A so that the intercepting member 28A is free to assume its operative position and to prevent further removal of filter rod sections 19 by the rotating drum 17. Thus, the leftmost propelling unit 9 of the pneumatic sender 4A ceases to deliver filter rod sections 19 to the leftmost filter tipping machine 1a of the group A shown in FIG. 1.

The signal which appears at the output d of the memory 137A (simultaneously with disappearance of a signal at the output c) is applied to the setting input a of the memory 137B whose output c transmits a signal to the corresponding input of the AND gate 142B. Therefore, as soon as the output c of the memory 143 transmits a signal to the other input of the AND gate 142B, the output of this gate transmits a signal to the amplifier 134B to energize the electromagnet 27B which retracts the associated intercepting member 28B so that the second leftmost propelling unit 9 of the pneumatic sender 4B is free to deliver filter rod sections to the leftmost pneumatic conveyor 12b' of FIG. 1 and thence into the receiving unit 11' of the magazine 66 forming part of the leftmost filter tipping machine 1a of the group A. Thus, instead of receiving filter rod sections 19 from the pneumatic sender 4A, the just mentioned filter tipping machine 1a is then supplied with filter rod sections from the pneumatic sender 4B. The second leftmost propelling unit 9 of the sender 4B cooperates with or includes the signal generators 58B, 62B, 64B, 123B, 124B and 132B. If one of these signal generators transmits a signal to the corresponding input of the OR gate 136B (the signal generator 123B or 124B transmits a signal by way of the corresponding time delay unit 126B or 127B), the output of the OR gate 136B transmits the signal to the erasing input b of the memory 137B. The condition of the memory 137B is then changed so that the signal at its output c disappears, i.e., the AND gate 142B ceases to transmit a signal to the amplifier 134B which deenergizes the electromagnet 27B with the result that the intercepting member 28B is free or is caused to reassume its operative position and to prevent further delivery of filter rod sections 19 from the next-to-the-leftmost propelling unit 9 of the sender 4B into the magazine 66 of the leftmost filter tipping machine 1a of the structure shown in FIG. 1.

When the signal at the output c of the memory 137B disappears, the output d of this memory transmits a signal which is applied to the setting input a of the memory 137A via OR gate 138. If the cause of malfunction of the propelling unit 9 which is controlled by the left-hand half of the unit 131 shown in FIG. 6 (or in the respective pneumatic conveyor 12a) is eliminated, i.e., if such propelling unit 9 is again ready to deliver filter rod sections 19 to the magazine 66 of the filter tipping machine 1a in the group A of FIG. 1, the dominant resetting input b of the memory 137A does not receive a signal from the output of the OR gate 136A and the memory 137A is free to change its condition so that its output c transmits a signal to the corresponding input of the AND gate 142A. Consequently, the intercepting member 28A is again in a position to permit or interrupt the delivery of filter rod sections 19 from the hopper 21 of the propelling unit 9 in the pneumatic sender 4A in dependency on the position of the trip 113 on the sensor 112, i.e., in dependency on the quantity of filter rod sections 19 in the magazine 66 of the corresponding filter tipping machine 1a. It will be noted that, as a rule, only one of the two propelling units 9 which cooperate with a given filter tipping machine delivers filter rod sections to the magazine 66 of such machine. The other of these propelling units 9 is held in a position of readiness so that it can begin with the delivery of filter rod sections 19 as soon as the one propelling unit is out of commission, either on purpose (signal generator 132A) or due to malfunction (signal generator 58A, 62A, 64A, 123A or 124A). In other words, the propelling unit 9 of the sender 4A should not remain idle until and unless the associated propelling unit 9 of the sender 4B (or the associated pneumatic conveyor 12b') is out of commission (again, either on purpose as a result of actuation of the signal generator 132B or due to a malfunction as indicated by a signal from the signal generator 58B, 62B, 64B, 123B or 124B). As a rule, it is desirable that the leftmost propelling unit 9 of the sender 4A reassume the delivery of filter rod sections 19 to the corresponding magazine 66 without any appreciable delay, i.e., as soon as the attendant has deactivated the signal generator 132A or as soon as the signal generator 58A, 62A, 64A, 123A or 124A has ceased to transmit "defect" signals to the corresponding input of the OR gate 136A. On the other hand, it is also desirable to avoid mere instantaneous activation of the other propelling unit 9 (namely, of the next-to-the-leftmost propelling unit 9 of the pneumatic sender 4B) because an activation which is immediately followed by deactivation of one and the same propelling unit 9 is likely to cause malfunctioning of such unit and/or of the associated pneumatic conveyor.

Very short-lasting activation of the propelling unit 9 which is controlled by the right-hand portion of the control unit 131 shown in FIG. 6 is prevented as follows: As already explained hereinbefore, the next-to-the-leftmost propelling unit 9 of the pneumatic sender 4B is activated in response to transmission of a signal to the setting input a of the memory 137B so that its output c transmits a signal to the corresponding input of the AND gate 142B which effects energization of the electromagnet 27B for the intercepting member 28B on receipt of a signal from the memory 143. The output c of the memory 137B is connected with the aforementioned signal shortening or lengthening unit 141 so that the output of the unit 141 transmits a signal to the corresponding input of the NAND gate 139 for a preselected interval of time which depends on the setting of the unit 141. Thus, the leftmost propelling unit 9 of the pneumatic sender 4A can be activated only after elapse of that interval of time which is selected by adjustment of the unit 141. This will be readily appreciated since, when the output of the OR gate 136A ceases to transmit a signal (because the operator has decided to deactivate the signal generator 132A or because the cause of malfunction which has entailed the transmission of a "defect" signal by the signal generator 58A, 62A, 64A, 123A or 124A has been eliminated), the corresponding propelling unit 9 (of the sender 4A) can be reactivated only when the unit 141 ceases to transmit a signal to the corresponding input of the NAND gate 139. The gate 139 transmits a signal only when neither of its inputs receives a signal. A signal from the output of the NAND gate 139 (via OR gate 138) is necessary for application to the input a of the memory 137A whose output c then transmits a signal to the AND gate 142A. Moreover, the signal which appears at the output c of the memory 137A is applied to the erasing input b of the memory 137B to terminate the delivery of filter rod sections 19 from the sender 4B at the time of resumption of delivery of filter rod sections 19 from the sender 4A.

As already explained in connection with FIG. 1, each of the five groups A, B, C, D and E of four filter tipping machines (1a, 1b, 1c, 1d) each normally receives filter rod sections 19 from a common maker 2A, 2B, 2C, 2D or 2E. Each of the makers 2A to 2E is connected with the respective groups A, B, C, D or E of machines 1a to 1d by a discrete reservoir system 3A, 3B, 3C, 3D or 3E, a discrete sender 4A, 4B, 4C, 4D or 4E and the corresponding set of eight pneumatic conveyors (such as the leftmost pneumatic conveyors 12a, 12b, 12c, 12d, the leftmost conveyor 12b', the leftmost conveyor 12c', the leftmost conveyor 12d' and the leftmost conveyor 12e' for the four machines 1a to 1d of the group A). The control unit 131 of FIG. 6 can be used to ensure that the supplies 109 in the reservoirs 66 of all twenty filter tipping machines remain constant or nearly constant, i.e., that the upper levels of such supplies do not appreciably deviate from a desired optimum or average level. To this end, the bottom conveyors of the reservoir systems 3A to 3E are provided with forward and reverse counters (not shown) of any known design. As mentioned above, the reservoir systems 3A to 3E may be of the type known as RESY manufactured by the assignee of the present application. In such reservoir systems, one or more so-called surge bins or first-in last-out reservoirs have bottom walls in the form of endless conveyor belts which can be driven to advance filter rod sections into or to move filter rod sections out of the respective surge bins. The bottom conveyors of the surge bins effect the operation of the respective forward and reverse counters so that the stands of (and output signals transmitted by) the counters are indicative of the quantities of filter rod sections which are stored in the respective surge bins. When both parts of an assembly which is constructed to deliver filter rod sections 19 to a given machine 1a, 1b, 1c or 1d are operative (e.g., if the assemblies including the makers 2A, 2B, the reservoir systems 3A, 3B, the senders 4A, 4B and the leftmost pneumatic conveyors 1a and 1b' of FIG. 1 are ready to deliver filter rod sections 19 to the leftmost machine 1a of the unit A), the control unit for such leftmost machine further comprises means for receiving signals from the outputs of the forward and reverse counters in the reservoir systems 3A and 3B. The control unit 131 then activates the corresponding propelling unit 9 of that sender (4A or 4B) which cooperates with the reservoir system (3A or 3B) whose surge bin contains a larger quantity of filter rod sections 19. The construction of a reservoir system which can be used in the apparatus of FIG. 1 is disclosed, for example, in the commonly owned copending application Ser. No. 130,392 filed Mar. 14, 1980 by Tolasch et al. or in the commonly owned copending application Ser. No. 130,391 filed Mar. 14, 1980 by Bäse et al.

The control unit 131 then comprises a signal comparing stage whose inputs receive signals from the forward and reverse counters of the two reservoir systems 3A and 3B and whose output transmits a signal to the memory 137A or 137B so as to ensure that the output c of the respective memory transmits a signal to the associated amplifier 134A or 134B as soon as the output c of the memory 143 transmits a signal denoting that the magazine 66 of the left-most machine 1a in FIG. 1 requires a supply of additional filter rod sections 19. In this manner, the control unit 131 always activates a propelling unit 9 belonging to that sender (4A or 4B) which is associated with the reservoir system (3A or 3B) which, at such time, stores a larger supply of filter rod sections 19. The provision of the just discussed connections between the forward and reverse counters of the reservoir systems and the control units 131 for the respective filter tipping machines ensures a more uniform utilization of the entire plant, i.e., each and every reservoir system is used to the same or nearly the same degree, and the same applies for the makers and senders of the plant. Moreover, such mode of operation ensures that each and every part of the plant contains an adequate supply of filter rod sections 19 for immediate delivery to a filter tipping machine wherein the supply of filter rod sections has descended below a minimum permissible or acceptable level.

The aforediscussed objects can be accomplished in a somewhat different way by providing the control unit 131 of FIG. 6 with a flip-flop circuit which alternately actuates the one or the other sender for a given filter tipping machine when the magazine 66 of such machine requires a fresh supply of filter rod sections 19. In other words, and referring again to the leftmost filter tipping machine 1a in the group A of FIG. 1, the senders 4A and 4B (as well as the associated reservoir systems 3A, 3B and the corresponding makers 2A, 2B) are assumed to be operative when the leftmost filter tipping machine 1a of the group A requires a fresh supply of filter rod sections 19. The flip-flop circuit also ensures uniform or practically uniform utilization of all components of the assemblies which deliver filter rod sections 19 to various filter tipping machines. Thus, when a given machine requires a fresh supply of filter rod sections for the first time, it receives such sections from one of the associated senders; when the same machine again requires filter rod sections, they are supplied by the other associated sender; thereupon again by the one sender; and so forth.

Figure 7:
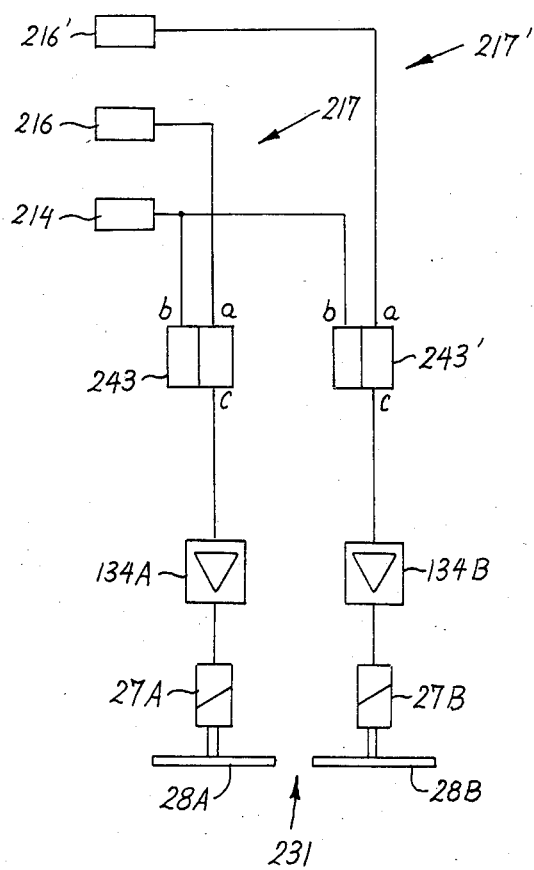
FIG. 7 is a circuit diagram of a modified control unit for regulation of the delivery of filter rod sections to opposite sides of the magazine of a filter tipping machine.

FIG. 7 shows a control unit 231 which can be used as a substitute for the control unit 131 and can dispense with some or all of the signal generators shown in FIG. 6. The monitoring device 117 of FIG. 4 (denoted in FIG. 7 by the reference character 217 and including proximity switches 214, 216) is combined with a second monitoring device 217' which includes the proximity switch 214 and a further proximity switch 216' (indicated in FIG. 4 by a broken-line circle above the switch 116). The trip 113 of the sensor 112 shown in FIG. 4 comes sufficiently close to the proximity switch 216' of the second monitoring device 217' when the supply 109 of filter rod sections 19 in the magazine 66 is depleted to a minimum permissible level.

The proximity switches 216 and 214 are respectively connected with the inputs a and b of a memory 243 whose output c is connected with the amplifier 134A for the electromagnet 27A which, in turn, controls the position of the intercepting or delivery interrupting member 28A in the same way as described in connection with FIGS. 2, 3 and 6.

The proximity switches 216' and 214 are respectively connected to the inputs a and b of a second memory 243' whose output c is connected with the amplifier 134B for the electromagnet 27B which controls the intercepting or delivery interrupting member 28B in the respective propelling unit 9.

The operation of the control unit 231 of FIG. 7 is analogous to that of the control unit 131. Thus, when the proximity switch 216 of the monitoring device 217 transmits a signal to the input a of the memory 243, the output c of this memory transmits a signal to the amplifier 134A which energizes the electromagnet 27A so that the intercepting member 28A is retracted to its inoperative position and the corresponding propelling unit 9 of the primary sender (e.g., 4A) delivers filter rod sections 19 into the associated pneumatic conveyor, e.g., into the conveyor serving to supply filter rod sections 19 to the left-hand feeding means 71 of FIG. 4. When the supply 109 in the magazine 66 is replenished to such an extent that the trip 113 of the sensor 112 shown in FIG. 4 actuates the proximity switch 214, the erasing input b of the memory 243 receives a signal and the output c of this memory ceases to transmit a signal for energization of the electromagnet 27A with the result that the intercepting member 28A interrupts the delivery of filter rod sections 19 to the corresponding pneumatic conveyor.

If the propelling unit 9 which includes the intercepting member 28A of FIG. 7 is out of commission for any one of a number of reasons, the supply 109 of filter rod sections 19 in the magazine 66 drops below that level at which the trip 113 of the sensor 112 normally causes the proximity switch 216 to transmit a signal to the input a of the memory 243, i.e., at which the primary sender (4A) for the particular magazine 66 begins to supply filter rod sections 19. The upper level 108 of the supply 109 in the magazine 66 then descends to the level at which the trip 113 of the sensor 112 actuates the proximity switch 216' which transmits a signal to the input a of the memory 243' whose output c transmits a signal to the amplifier 134B to energize the electromagnet 27B which retracts the intercepting member 28B and allows the secondary sender (4B) to proceed with the delivery of filter rod sections 19 into the magazine 66 via feeding means 71'. The delivery of filter rod sections 19 is interrupted when the upper level 108 of the supply 109 in the magazine 66 rises to such an extent that the trip 113 actuates the proximity switch 214 which transmits a signal to the erasing input b of the memory 243' whereby the signal at the output b of the memory 243' disappears and the intercepting member 28B prevents further delivery of filter rod sections 19 from the corresponding propelling unit 9 of the secondary sender 4B.

An advantage of the control unit 231 is that there is no need for signal generators which detect malfunctions of the associated propelling units 9 and/or pneumatic conveyors. All that is needed is to modify the monitoring means so as to add a further proximity switch (216'). The monitoring means of FIG. 7 comprises two integrated monitoring devices 217, 217' having a common signal generator 214. Each of the devices 217, 217' can comprise two discrete signal generators in the form of proximity switches or the like. Thus, the device 217' can utilize a discrete proximity switch 216' at a level above the switch 216 of FIG. 4 and a discrete proximity switch in addition to the switch 214 and being located at the level of, below or above the switch 114 of FIG. 4. Also, each of the two monitoring devices 217, 217' can employ a discrete sensor.

The main difference between the control units 131 and 231 is that the unit 231 is simpler and also that the unit 231 "recognizes" or detects the malfunctioning of the propelling unit which includes the intercepting member 28A of FIG. 7 by detecting (via signal generating means 216') that the supply of sections 19 in the magazine 66 of the respective filter tipping machine has dropped to a predetermined minimum permissible level. Thus, the unit 231 does not pinpoint the exact cause of malfunction of a propelling unit and/or the associated pneumatic conveyor but simply reacts to such malfunction to activate the other (satisfactory) propelling unit and the associated (satisfactory) pneumatic conveyor.

An important advantage of the improved apparatus is that each processing machine 1a, 1b, 1c or 1d can receive filter rod sections whenever necessary regardless of whether or not one of the corresponding propelling units 9 and/or one of the corresponding pneumatic conveyors 12 is out of commission. Since each of the senders 4A to 4E embodies its own source of filter rod sections 19 (see the hopper 21 in FIGS. 2 and 3 or the corresponding reservoir system), and since each of the filter tipping machines 1a–1d can receive filter rod sections 19 from two discrete propelling units 9 which form part of two different senders, the failure or malfunctioning of an entire sender also cannot cause an interruption of delivery of filter rod sections to the magazine 66 of a filter tipping machine 1a, 1b, 1c or 1d. Thus, the delivery of filter rod sections 19 to the magazines 66 under a host of adverse circumstances is much more reliable than in heretofore known apparatus in spite of the fact that the number of makers (2A–2E) need not exceed the number of groups (A–E) of filter tipping machines 1a–1d, that the number of reservoir systems (3A–3E) and/or the number of senders (4A–4E) need not exceed the number of makers (2A–2E) and that the number of makers can be only a small fraction of the total number of filter tipping machines.

Another important advantage of the improved apparatus is that the attendants need not hurry to repair or replace a given propelling unit 9, a given pneumatic conveyor and/or a given sender because the other propelling unit 9 of each pair of associated propelling units (namely of that pair of propelling units which can deliver filter rod sections to pneumatic conveyors for transport into one and the same magazine) suffices to guarantee adequate feed of filter rod sections in the corresponding magazine 66 while the one propelling unit 9 and/or the appurtenant component or components of the apparatus are under repair. This applies regardless of whether the idling of a given propelling unit is due to malfunction or is attributable to other reasons (such as the need for intermittent inspection and/or repair work of a nature other than that which entails a breakdown of the corresponding propelling unit, of the associated pneumatic conveyor and/or of the corresponding sender). As mentioned above, presently known proposals to avoid lengthy stoppages of filter tipping machines due to lack of filter rod sections include the utilization of a system of chargers which must be filled with filter rod sections at the maker, transported to storage or to the locale of use, and emptied at the magazine of a filter tipping machine with considerable outlay for additional costly, sensitive and bulky equipment. The operation with chargers is especially cumbersome if the chargers must be filled, emptied and/or transported by hand.

Since a single sender with several propelling units can supply filter rod sections to a substantial number of pneumatic conveyors, the improved apparatus renders it possible to connect a very large number of processing machines (such as filter tipping machines) with a relatively small number of multiple-unit senders and with an equally small number of reservoir systems and producing machines or makers. The apparatus takes advantage of the fact that a reservoir system can readily satisfy the needs of a sender with several propelling units, even when two or more propelling units of one and the same sender are required to simultaneously deliver filter rod sections to the machines of two or more discrete processing machines. This is even more so since it does not happen very often that each and every processing machine of each and every group always operates at full capacity or operates at full or nearly full capacity for long periods of time. Therefore, the combination of a reservoir system with a sender which embodies several propelling units is even more likely to temporarily meet the requirements of two or even more discrete filter tipping or like processing machines. Nevertheless, and to be on the safe side, the output of each maker (2A, 2B, 2C, 2D or 2E) is preferably selected in such a way that it at least equals or even slightly exceeds the combined maximum requirements of all filter tipping machines (1a to 1d) of the group A, B, C, D or E.

As shown in FIG. 1, it is often advisable to select the number of processing machines in a group in such a way that it is less, by one, than the number of groups and less than the maximum number of machines which can receive filter rod sections from a single maker. This improves the overall efficiency of the entire apparatus by reducing the number of down times. The number of down times is further reduced, and the efficiency of the apparatus is improved still further if the number of propelling units 9 in each of the senders equals 2m, m being the number of processing machines in a group. This renders it possible to select the connections between the various processing machines and the propelling units of the senders in the aforedescribed manner, namely, so that temporary failure or temporary intentional shutdown of a set of components including a sender, the corresponding pneumatic conveyors and/or the corresponding reservoir system and/or maker does not cause any interruption of further operation of the processing machines. This is due to the fact that, when a given sender (e.g., the sender 4A) is out of commission, the machines 1a–1d of the group A can continue to turn out filter cigarettes since the machine 1a of the group A can receive filter rod sections from the sender 4B, the machine 1b from the sender 4C, the machine 1c from the sender 4D and the machine 1d from the sender 4E.

The purpose of the control units is to relieve the attendants, i.e., to ensure that the attendants need not continuously monitor the supplies 109 of filter rod sections 19 in the magazines 66 in order to make sure that such supplies will not fluctuate within an excessive range, that the supplies will not be depleted or that the magazines will not be filled to overflowing. First of all, each propelling unit 9 can be started or arrested independently of the other propelling unit or units, e.g., by actuating the signal generator 132A or 132B. Secondly, the various signal generators of FIG. 6 generate signals in response to interruption of delivery of filter rod sections 19 from a sender to the corresponding receiving unit or units. Furthermore, each control unit 131 can start the second of the two propelling units 9 for a given processing machine when the first of these propelling units is idle, or vice versa. Rapid switchover from delivery by one pneumatic conveyor to delivery by the other pneumatic conveyor for a given magazine 66 is especially desirable and advantageous if the pneumatic conveyors are designed in such a way that they must advance filter rod sections at or close to the upper limit of their capacity if the corresponding magazine is to receive a requisite quantity of filter rod sections per unit of time while such magazine receives filter rod sections from a single pneumatic conveyor (this is contemplated in the embodiment which is illustrated in the drawing). The provision of plural signal generators for each propelling unit 9 is also of help in this connection because the attendants can rapidly locate the locale of a defect or malfunction so that the cause of malfunction can be eliminated with a minimum of delay. It can be said that the improved apparatus comprises a plurality of sets of components each of which includes a pneumatic propelling unit, the corresponding pneumatic conveyor and the respective receiving unit, and that each such set is equipped or cooperates with an entire array of signal generators each of which is capable of monitoring a different defect or potential defect and is installed at a locus where the respective defect or malfunction is most likely to occur or most likely to be detected. This can be readily seen by referring again to FIG. 3 wherein the signal generator 123 readily detects eventual causes of malfunction or simply detects malfunctions at the inlet 12i of the pneumatic conveyor 12, the signal generator 62 readily detects the presence of destroyed filter rod sections 19 and the resulting disconnection of the shaft 16 from the shaft 61, the signal generator 58 readily detects the lack of readiness of the illustrated propelling unit 9 to deliver filter rod sections 19 into the pneumatic conveyor 12, and the signal generator 64 readily detects the absence of a sufficient number of filter rod sections in the source or hopper 21. The same holds true for the signal generator 124 of FIG. 5.

The illustrated receiving units 11 and 11' for each magazine 66 are designed with a view to guarantee proper admission of all filter rods 19 into the interior of the magazine. This is accomplished by the provision of belts 88', 89' and 88, 89 whose parallel inner reaches define channels having a width that is preferably slightly less than the diameter of a filter rod section so that the sections 19 are forcibly introduced into the magazine 66 at the respective sides and cannot lie askew during transport toward, during transport through and-/or during transport beyond the respective funnels 106 and 106'. The placing of the two receiving units 11 and 11' at the opposite sides of the magazine 66, i.e., opposite each other, ensures that the filter rod sections 19 which are admitted by the funnel 106 cannot interfere with the admission of filter rod sections 19 via funnel 106' or vice versa.

The monitoring device 117 for each of the magazines 66 is connected with the corresponding propelling unit 9 in a manner as shown in FIG. 6, i.e., signals which are generated by the detectors 114 and 116 are used to control the positions of the corresponding intercepting members 28A and 28B so as to regulate the admission of filter rod sections 19 to the respective propelling units 9. These detectors can be said to form part of the corresponding control unit 131.

Portions of receiving units which are similar to those shown in FIGS. 4 and 5 are described and claimed in commonly owned U.S. Pat. No. Re. 28,283 granted Apr. 8, 1975 to Willy Rudszinat.

Figure 8A:
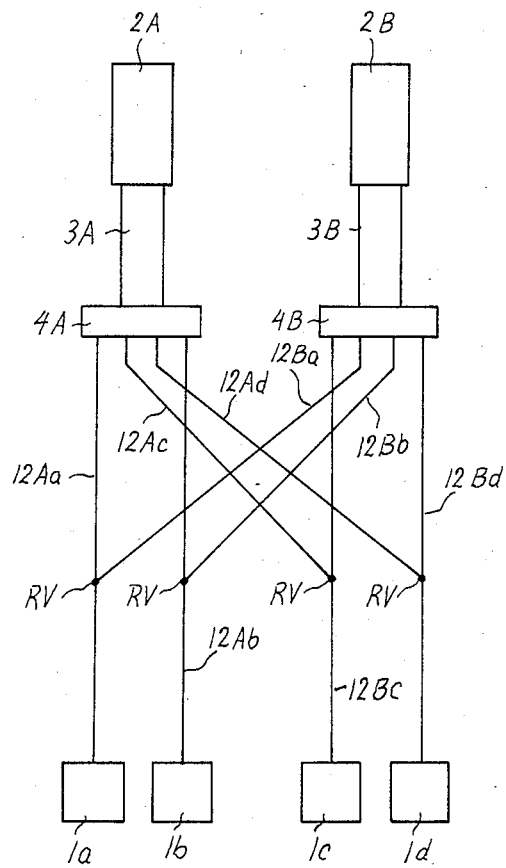
FIG. 8a is a schematic plan view of a pair of production lines with a total of four filter processing machines and a junction between each pair of pneumatic conveyors which can supply filter rod sections to a given machine.

FIG. 8a illustrates a modified apparatus which produces filter cigarettes and employs four filter tipping machines 1a, 1b, 1c, 1d receiving filter rod sections from two filter rod making machines 2A and 2B which may be identical with those discussed above in connection with FIG. 1, i.e., of the type KDF manufactured by the assignee of the present application. The filter rod sections which are turned out by the machines 2A and 2B respectively pass through reservoir systems 3A and 3B (e.g., of the type known as RESY which is manufactured by the assignee of the present application) and pneumatic senders 4A and 4B (e.g., of the type known as FILTROMAT which is manufactured by the assignee of the present application). Each of the senders 4A, 4B comprises four propelling units 9 (not specifically shown) of the type illustrated in FIGS. 2 and 3, and each of the filter tipping machines 1a to 1d comprises a single receiving unit 11 or 11' of the type shown in FIG. 4. The connections between the propelling units 9 of the sender 4A and the packing machines 1a to 1d comprise a total of four pneumatic conveyors 12Aa, 12Ab, 12Ac, 12Ad, and the connections between the four propelling units 9 of the sender 4B and the filter tipping machines 1a to 1d comprise four pneumatic conveyors 12Ba, 12Bb, 12Bc, 12Bd. The conveyors 12Aa and 12Ba deliver filter rod sections to the machine 1a; the conveyors 12Ab and 12Bb deliver filter rod sections to the machine 1b; the conveyors 12Ac and 12Bc deliver filter rod sections to the machine 1c; and the conveyors 12Ad, 12Bd deliver filter rod sections to the machine 1d. The reference characters RV denote four junctions of the type shown in greater detail in FIGS. 9–10 or in FIG. 11. The leftmost junction RV enables the conveyor 12Ba to admit filter rod sections into the downstream portion of the conveyor 12Aa; the next-to-the-leftmost junction RV enables the conveyor 12Bb to deliver filter rod sections into the downstream portion of the conveyor 12Ab; the next-to-the-rightmost junction RV enables the conveyor 12Ac to deliver filter rod sections into the downstream portion of the conveyor 12Bc; and the rightmost junction RV of FIG. 8a enables the conveyor 12Ad to deliver filter rod sections into the downstream portion of the conveyor 12Bd. Of course, it can be stated just as accurately that the leftmost junction RV enables the conveyor 12Aa to deliver filter rod sections into the downstream portion of the conveyor 12Ba, and so forth. It will be noted that each of the four propelling units 9 in the sender 4A or 4B can supply filter rod sections to each of the four filter tipping machines 1a to 1d.

In normal operation, the filter tipping machines 1a and 1b receive filter rod sections from the sender 4A, and the filter tipping machines 1c and 1d receive filter rod sections from the sender 4B. If the filter rod making machine 2A or 2B is defective or its output is reduced (e.g., to zero) for another reason, if the reservoir system 3A or 3B is defective, if the sender 4A or 4B is defective, or if one or more propelling units 9 of the sender 4A or 4B are defective, all of the filter tipping machines 1a and 1b can remain in operation because they then receive filter rod sections from the remaining (non-defective) filter rod making machine (2B or 2A), reservoir system (3B or 3A), sender (4B or 4A) or group of propelling units 9. Automatic switchover from delivery of filter rod sections from the sender 4A to delivery of filter rod sections from the sender 4B or vice versa can be effected by a control circuit which may be of the type shown in FIG. 12 or FIG. 13.

Figure 8B:
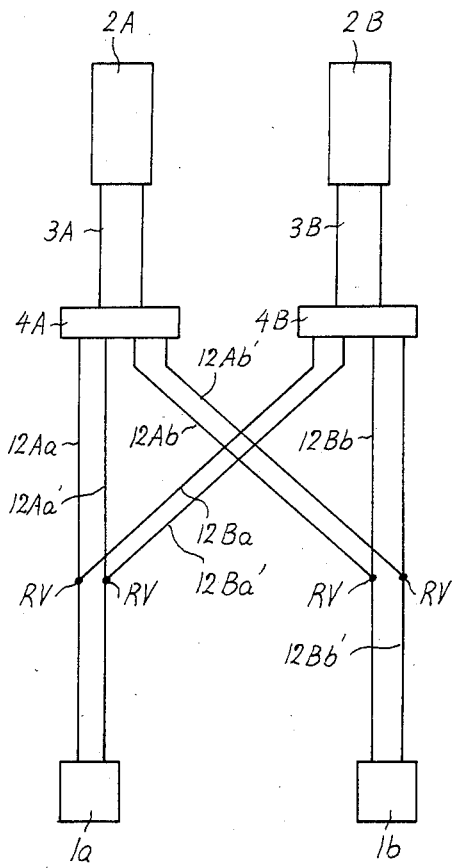
Figure 12:
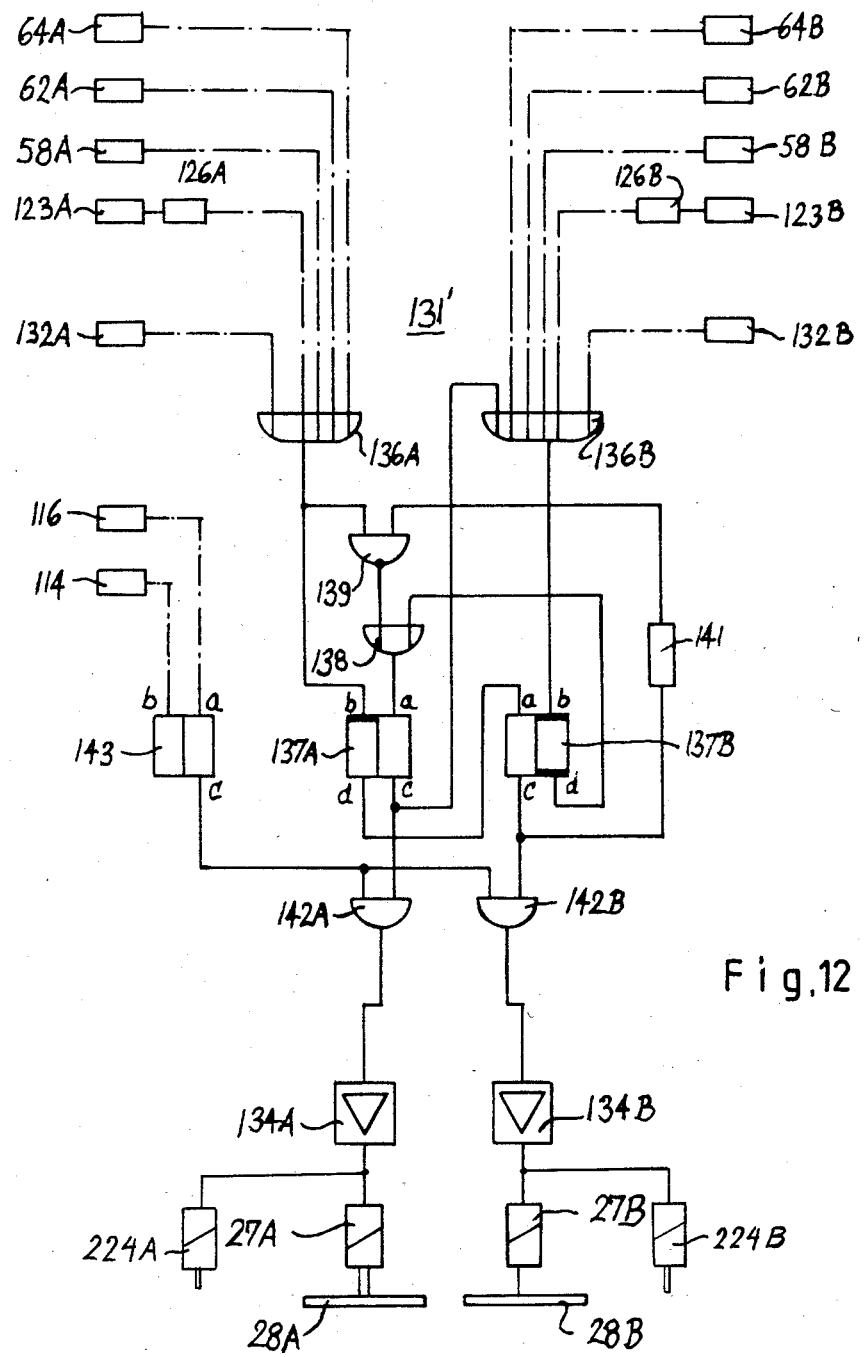
FIG. 12 is a circuit diagram of a control unit which constitutes a modification of the control unit shown in FIG. 6 and is designed for use in production lines employing junctions of the type shown in FIG. 11.
Figure 13:
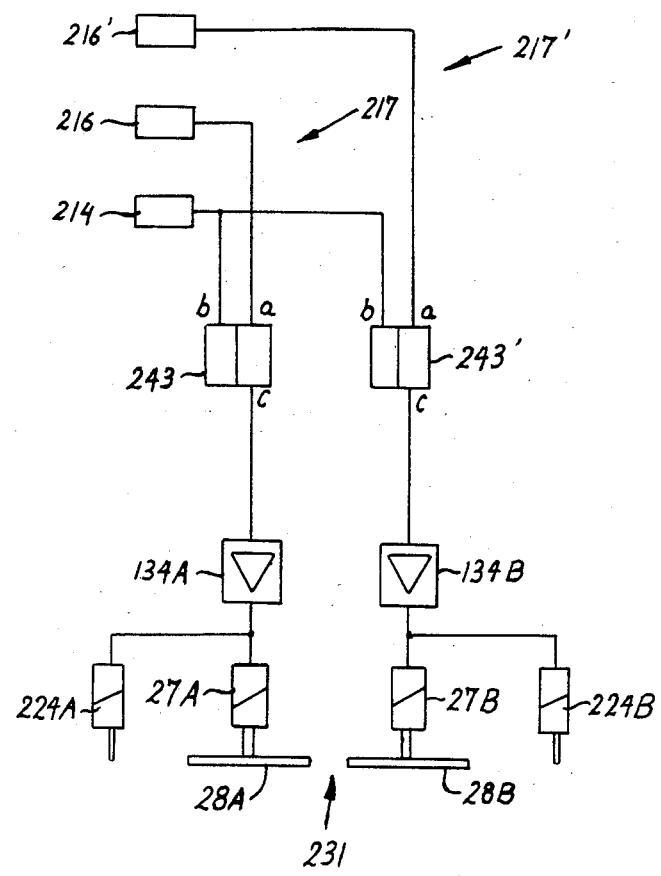
FIG. 13 is a circuit diagram of a control unit which constitutes a modification of the control unit shown in FIG. 7 and is intended for use in production lines employing junctions of the type shown in FIG. 11.

FIG. 8b shows a further apparatus with two filter rod making machines 2A, 2B, two reservoir systems 3A, 3B, two pneumatic senders 4A, 4B (each of which has four propelling units 9 of the type shown in FIGS. 2 and 3), two filter tipping machines 1a, 1b, and eight pneumatic conveyors 12Aa, 12Aa', 12Ab, 12Ab', 12Ba, 12Ba', 12Bb and 12Bb'. In contrast to the machines 1a to 1d of FIG. 8a, each of the machines 1a, 1b shown in FIG. 8b is provided with two filter rod receiving units 11, 11', the same as the machines 1a to 1d of of FIG. 1. The conveyors 12Aa, 12Aa' or 12Ba, 12Ba' respectively deliver filter rod sections to the treating units 11, 11' of the left-hand machine 1a, and the conveyors 12Ab, 12Ab' or 12Bb, 12Bb' respectively deliver filter rod sections to the treating units 11 and 11' of the machine 1b shown in FIG. 8b. The junctions RV between the conveyors 12Aa-12Ba, 12Aa'-12Ba', 12Ab-12Bb and 12Ab'-12Bb' may be identical with the junction shown in FIGS 9-10 or with the junction shown in FIG. 11. If the machine 2A, reservoir system 3A and/or sender 4A is out of commission, the machine 1a of FIG. 8b can receive filter rod sections from the propelling units 9 of the sender 4B, and the machine 1b of FIG. 8b can receive filter rod sections from the propelling units 9 of the sender 4A in the event of malfunction of the machine 2B, reservoir system 3B and/or sender 4B. Furthermore, if only one, two or three propelling units 9 in the sender 4A or 4B are out of commission, the filter tipping machine 1a or 1b of FIG. 8b can simultaneously receive filter rod sections from each of the senders 4A, 4B. Two embodiments of an automatic control circuit which can be used to effect conversion of the operation of the apparatus shown in FIG. 8b in the event of the just discussed malfunctions are shown in FIGS. 12 and 13. One such control circuit is provided for each of the two filter tipping machines 1a, 1b shown in FIG. 8b.

The reason for a switchover in the apparatus of FIG. 8a or 8b need not necessarily be a malfunctioning of one or more constituents (such as 2A or 2B, 3A or 3B, or 4A or 4B) of the respective apparatus. For example, if the machine 1a of FIG. 8b or the machines 1a, 1b of FIG. 8a are used to temporarily produce a brand of filter cigarettes which is different from the brand produced in the machine 1b of FIG. 8b or the machines 1c, 1d of FIG. 8a (i.e., if the filter rod sections produced by the machine 2A are different from those which are turned out by the machine 2B), the operators can temporarily switch over so that all of the machines 1a-1d of FIG. 8a and both machines 1a, 1b of FIG. 8b will remain operative but at least one machine of each apparatus will turn out a first type of products whereas the remaining machine or machines will simultaneously produce another type of filter cigarettes. This results in better utilization of all constituents of the apparatus irrespective of whether or not all filter tipping machines turn out the same type of product.

Figures 9, 10:
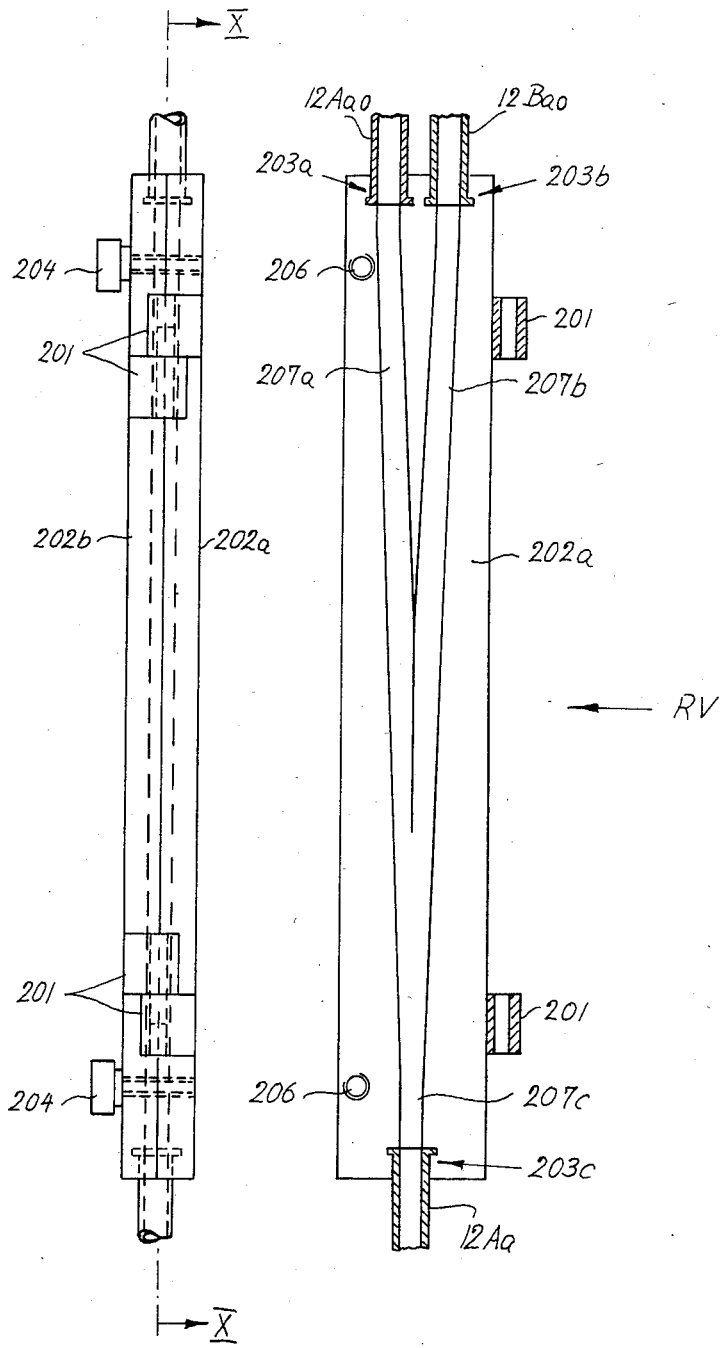
FIG. 9 is an enlarged side elevational view of a junction.
FIG. 10 is a sectional view as seen in the direction of arrows from the line X—X of FIG. 9.

The junction RV of FIGS. 9 and 10 comprises two mirror symmetrical guide members 202a, 202b which are pivotally connected to each other by hinges 201 and have coupling portions 203a, 203b, 203c for connection to portions of pneumatic conveyors. The junction RV of FIGS. 9 and 10 corresponds to the leftmost junction of FIG. 8a; therefore, its coupling portions 203a, 203b, 203c are respectively connected to the outlet 12Aao of the conveyor 12A, to the outlet 12Bao of the conveyor 12Ba and to the inlet of an additional pneumatic conveyor 112Aa forming part of the junction RV and serving to convey filter rod sections to the magazine of the machine 1a. The reference characters 204 denote screws or analogous devices which can releasably hold the guide member 202a or 202b in a closed position so that the guide members define a substantially Y-shaped passage having convergent branches 207a, 207b respectively receiving filter rod sections from the outlet 12Aao of the conveyor 12Aa and from the outlet 12Bao of the conveyor 12Ba, and a joint part 207c which delivers filter rod sections to the additional pneumatic conveyor 112Aa, either from the conveyor 12Aa or from the conveyor 12Ba. The shanks of the screws 204 extend into tapped bores 206 in one of the guide members. The angle between the branches 207a, 207b is a relatively small acute angle. The branch 207a and the part 207c of the Y-shaped passage establish a path for the travel of filter rod sections between the conveyors 12Aa and 112Aa, whereas the branch 207b and the part 207c of such passage establish a path for the travel of filter rod sections from the conveyor 12Ba to the conveyor 112Aa.

FIG. 9 shows the guide member 202b in closed position; this guide member is then located in the plane of the outlets 12Aao, 12Bao and of the illustrated portion of the additional conveyor 112Aa. The latter conveyor can be said to constitute an extension of the conveyor 12Aa or 12Ba. When the guide member 202b is moved to its open position, the passage including the branches 207a, 207b and part 207c is readily accessible for cleaning.

Figure 11:
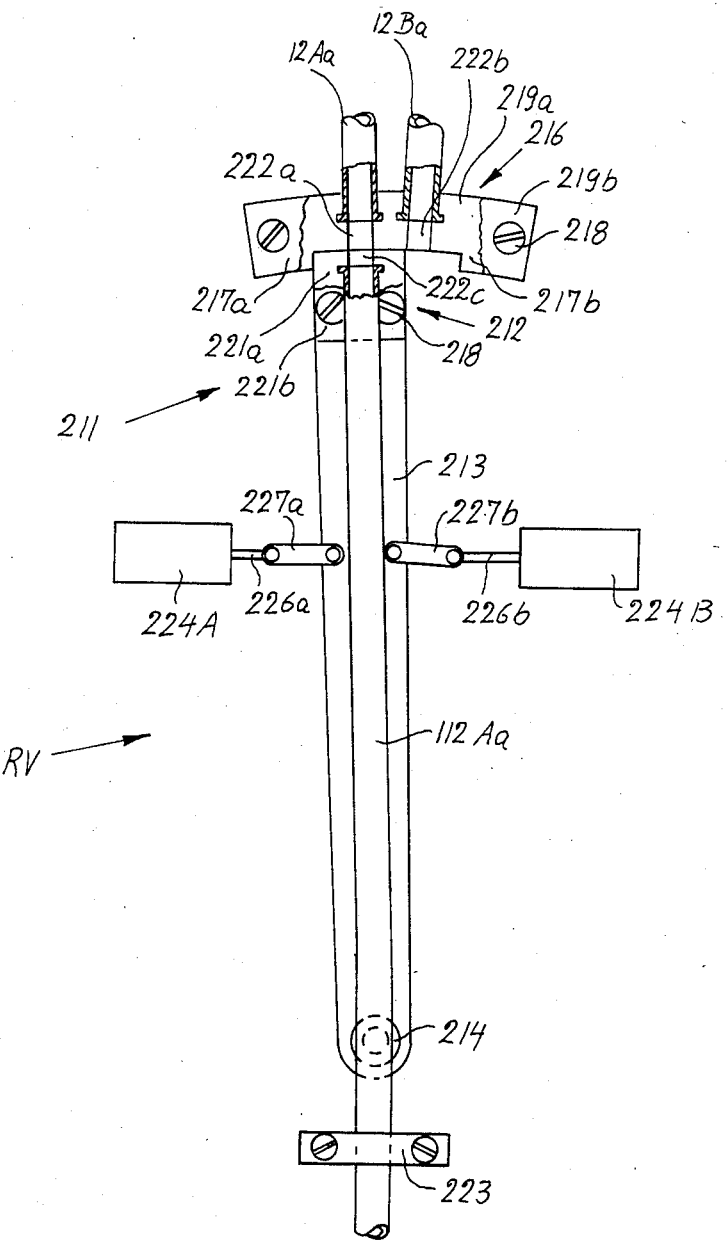
FIG. 11 is a schematic partly elevational and partly sectional view of a modified junction.

FIG. 11 illustrates a modified junction RV' wherein an elongated guide member 211 can be said to constitute a pivotable portion of the conveyor 12Aa or an additional pneumatic conveyor leading to the receiving means of a magazine. The upper end portion or inlet 212 of the conveyor or guide member 211, as viewed in FIG. 11, can be placed into register with the outlet of the conveyor 12Aa or with the outlet of the conveyor 12Ba. The junction RV' resembles a railroad switch.

The conveyor 211 is pivotable with a carrier 213 about the axis of a pivot member 214. The end portion or inlet 212 is pivotable back and forth within the confines of a recess between two stops 217a, 217b provided on a stationary support 216 for the adjacent outlets of the conveyors 12Aa and 12Ba. The support 216 includes two halves or clamps 219a, 219b which are separably held together by screws 218 or other suitable fasteners so as to grip the outlets of the conveyors 12Aa, 12Ba therebetween. Analogously, the inlet 212 of the additional conveyor 112Aa of FIG. 1 is held fast between two clamping elements 221a, 221b which are held together by screws 218. The support 216 defines two connecting channels 222a, 222b, and the carrier 213 defines a single connecting channel 222c which can be brought into register with the channel 222a or 222b, depending upon whether the filter rod sections are to advance from the conveyor 12Aa or from the conveyor 12Ba to enter the conveyor 112Aa. FIG. 11 shows the illustrated junction RV' in a position wherein the filter rod making machine which is connected to the additional conveyor 112Aa receives filter rod sections from one of the propelling units in the sender 4A. The means for shifting the carrier 213 with the inlet of the conveyor 112Aa comprises a pair of stationary electromagnets 224A, 224B whose armatures 226a, 226b are respectively connected to the carrier 213 by links 227a, 227b. The links 227a, 227b are disposed at the opposite sides of the additional conveyor 112Aa. A clamp 223 holds a portion of the additional conveyor 112Aa at a level below the pivot means 214; this conveyor can constitute a deformable hose adapted to undergo necessary flexing in order to move the channel 222c into register with the channel 222a or 222b without interfering with the travel of filter rod sections therethrough.

Alternatively, the additional conveyor 112Aa can comprise a flexible section which is held by the clamp 223 and enables the remaining (rigid) part of the conveyor 112Aa to move from a position of abutment with the stop 217a to a position of abutment with the stop 217b or vice versa.

The electromagnet 224A can be designed to expel or retract its armature 226a in response to energization. It is assumed that each of the shifting electromagnets 224A, 224B is designed to retract the respective armature 226a, 226b when its circuit is completed by the aforementioned control unit. Thus, the electromagnet 224A will be energized to move the channel 222c into register with the channel 222a, and the electromagnet 224B will be energized to move the channel 222c into register with the channel 222b.

The control unit 131' of FIG. 12 is similar to the control unit 131 of FIG. 6. The apparatus of FIG. 8a employs four control units 131', and the apparatus of FIG. 8b employs two such control units. All such parts of the control unit 131' which are identical with or clearly analogous to the corresponding parts of the control unit 131 of FIG. 6 are denoted by similar reference characters. It will be noted that the control unit 131' does not employ the signal generators 124A, 124B of FIG. 6. On the other hand (and if the junctions in the apparatus of FIG. 8a or 8b are of the type shown in FIG. 11), the control unit 131' further comprises the aforediscussed shifting electromagnets 224A, 224B which are respectively connected in parallel with the electromagnets 27A, 27B and are energizable by the corresponding amplifiers 134A, 134B.

The mode of operation of the control unit 131' is also analogous to that of the control unit 131 shown in FIG. 6. If the junctions are of the type shown in FIG. 11, the control unit 131' embodies the electromagnets 224A, 224B so that the electromagnet 224A is energized simultaneously with the electromagnet 27A or that the electromagnet 224B is energized simultaneously with the electromagnet 27B. As explained in connection with FIG. 11, energization of the electromagnet 224A entails a movement of the channel 222c into register with the channel 222a so that the conveyors 12Aa and 112Aa are free to communicate with one another. If one of the signal generators 58A, 62A, 64A, 123A or 132A transmits a signal (for reasons which were explained in connection with FIG. 6), the electromagnets 27A and 224A are deenergized. The corresponding propelling unit 9 of the sender 4A is then inactive and the carrier 213 is preferably caused to assume a neutral or median position (e.g., under the action of one or more springs, not shown in FIG. 11) so that the channel 222c is located midway between but does not register with either one of the channels 222a, 222b. In the next step, the amplifier 134B energizes the electromagnets 27B, 224B (for reasons which were explained in connection with FIG. 6) to activate the corresponding propelling unit 9 of the sender 4B and to cause the channel 222c to move into accurate register with the channel 222b so that the conveyor 12Ba can deliver filter rod sections into the conveyor 112Aa. The filter tipping machine which is connected with the conveyor 112Aa of FIG. 11 then receives filter rod sections exclusively from the filter rod making machine 2B.

The electromagnets 224A, 224B are not needed if the junctions are of the type shown in FIGS. 9 and 10 because the additional conveyor 112Aa shown in these Figures is then in permanent communication not only with the conveyor 12Aa but also with the conveyor 12Ba.

The control unit 231' of FIG. 13 is analogous to that of FIG. 7 and its parts are denoted by similar reference characters. If the corresponding apparatus employs junctions of the type shown in FIG. 11, the control unit 231' further comprises the two shifting electromagnets 224A, 224B which are respectively connected in parallel with the electromagnets 27A, 27B and are respectively energizable by the amplifiers 134A, 134B. The mode of operation is otherwise identical with that of the control unit 231 shown in FIG. 7. The carrier 213 of FIG. 11 is automatically pivoted in response to energization of the electromagnet 27A or 27B due to simultaneous energization of the associated electromagnet 224A or 224B.

An important advantage of the junctions RV or RV' is that they contribute to lower cost of the apparatus, especially if the apparatus comprises a large or very large number of processing machines. The junctions RV or RV' can be placed close to the respective senders (4A and 4B in FIGS. 8a and 8b) so that the length of the pneumatic conveyor (112Aa) which extends from a junction to the respective machine 1a, 1b, 1c or 1d is quite pronounced, especially if the machines 1a–1d or 1a–1b are remote from the respective senders. The apparatus of FIG. 8a exhibits the additional advantage that one of the receiving units 11, 11' can be dispensed with for each of the machines 1a to 1d.

The exact nature of the junctions is of no consequence. The junctions RV are simpler than the junctions RV' because they need not employ electromagnets to shift the additional pneumatic conveyor. On the other hand, the junctions RV' exhibit the advantage that they can positively prevent simultaneous admission of filter rod sections from two propelling units 9 if simultaneous admission is not desirable.

The possibility of opening a junction (as disclosed in connection with the junction RV of FIGS. 9 and 10) is a desirable feature when such junction is used in a modern plant wherein the filter rod sections are processed in large quantities. For example, a modern filter tipping machine of the type known as MAX or MAX S can turn out up to and even well in excess of 7000 filter cigarettes per minute. Consequently, each and every interruption of operation of such a high-speed machine entails enormous losses in output. This is another reason why it is desirable to connect each filter tipping machine with several pneumatic conveyors each of which can deliver filter rod sections from a discrete propelling unit. In accordance with the present invention, this is accomplished by the expedient of enabling the control units to connect each filter tipping machine with either one of two different propelling units 9. Thus, and if compared with the proposal of the aforediscussed U.S. Pat. No. 3,397,922, the number of pneumatic conveyors can be reduced in half, and such number (or at least the overall length of pneumatic conveyors needed for each filter tipping machine) can be reduced still further by resorting to the junctions RV or RV', i.e., by using approximately 1½ pneumatic conveyors for each of the filter tipping machines.

An advantage of the control units 131' and 231' is that the shiftable additional conveyor 112A$a$ is automatically caused to assume the desired position with reference to the conveyors 12A$a$ and 12B$a$ whenever it becomes necessary to change from delivery of filter rod sections from a first propelling unit 9 (e.g., a propelling unit in the sender 4A of FIG. 8$a$ or 8$b$) to a second propelling unit which forms part of another sender and is set in operation to take the place of a defective or intentionally inactivated propelling unit.

An advantage of the reservoir systems (3A to 3E in FIG. 1) is that they enable the senders (4A to 4E in FIG. 1) to meet the requirements of a large number of filter tipping machines even if the associated filter rod making machines (such as the machines 2A to 2E of FIG. 1) are out of commission for extended periods of time. Each of the reservoir systems can employ a single surge bin or several surge bins, depending on the availability of space and the anticipated down times of the filter rod making machines. As explained above, it is particularly advantageous if the number of filter tipping machines (1$a$-1$d$) in each of the groups of filter tipping machines is n−1, wherein n is the number of pneumatic senders, and if the number of pneumatic conveyors in a set of conveyors and the number of propelling units in a sender equals 2m, wherein m is the number of filter tipping machines in a group. This renders it possible to closely conform the capacities of the filter tipping machines to those of the filter rod making machines. This further ensures that, if one of the filter rod making machines, reservoir systems or pneumatic senders is out of commission, each of the additional filter rod making machines, reservoir systems or pneumatic senders must merely take care of a single additional filter tipping machine. In other words, the degree of utilization of each and every constituent of the apparatus is very high, irrespective of whether or not each and every constituent is fully operative.

If the pneumatic conveyors are designed to operate close to capacity, it is important to ensure that the switchover from the delivery of filter rod sections to a filter tipping machine from one of the corresponding propelling units to the other propelling unit takes up minimal amounts of time. This is achieved by the provision of the aforediscussed control units each of which preferably comprises plural signal generators to ensure that each and every malfunction and/or cause of malfunction is detected practically without delay and that the changeover from delivery of filter rod sections from one of the senders to the delivery of filter rod sections from another sender is effected automatically and without any assistance on the part of the attendants. The signal generators can be designed to furnish visible, audible and/or otherwise detectable signals so that the attendants can readily locate the defects and eliminate the causes of malfunction with a minimum of delay.

While it is conceivable and possible to connect each filter tipping machine with more than two pneumatic conveyors (note FIG. 8$b$) it normally suffices if each such machine is connected with two propelling units belonging to different senders.

It will be noted that the filter rod making machine 2A or 2B of FIG. 8$a$ or 8$b$ is not a mere emergency or auxiliary machine which is used only and alone when the primary machine (2B or 2A) is out of commission. Instead, and this holds true for each embodiment of the improved apparatus, each and every filter rod making machine (2A to 2E), each and every reservoir system (3A to 3E) and each and every pneumatic sender (4A to 4E) normally satisfies the needs of one or more filter tipping machines. In other words, the apparatus need not be provided with one or more emergency production lines whose constituents become operative only when the constituents of the main production line or production lines become disabled or are arrested for other reasons. This ensures a highly economical utilization of all constituents of the apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for manipulating filter rod sections, comprising processing means including several filter processing machines, especially filter tipping machines, each having a magazine; conveyor means including first and second pneumatic conveyors for each of said machines and each having an inlet and an outlet; sender means including first and second pneumatic senders each having a source of filter rod sections and a plurality of propelling units, each propelling unit of said first sender being operable to deliver filter rod sections from the respective source to the inlet of a first conveyor and each propelling unit of said second sender being operable to deliver filter rod sections from the respective source to the inlet of a second conveyor; receiving means for transferring into said magazines filter rod sections supplied by the outlets of the respective first and second conveyors; and means for independently starting and arresting each propelling unit of each of said senders.

2. The apparatus of claim 1, wherein said pneumatic conveyors include means for conveying the filter rod sections lengthwise and said receiving means include means for delivering filter rod sections into the respective magazines by moving the filter rod sections sideways.

3. The apparatus of claim 1, further comprising signal generating means including at least one signal generator for each of said propelling units and each arranged to transmit a signal denoting a malfunction of the respective propelling unit and/or the corresponding conveyor.

4. The apparatus of claim 3, further comprising control means, one for each first conveyor and the corresponding second conveyor and each including means for normally effecting the operation of only one of the propelling units which deliver filter rod sections to the respective first and second conveyors and means for automatically starting the other propelling unit in the event of malfunction of the one propelling unit and/or of the associated conveyor, and vice versa.

5. The apparatus of claim 4, wherein said signal generating means includes a plurality of signal generators for each of said propelling units and the corresponding conveyors, each of said first conveyors and the corresponding second conveyor, as well as the associated propelling units, having portions which are likely to develop malfunctions and said signal generators being positioned to generate signals in response to development of malfunctions at said portions of the respective propelling units and conveyors.

6. The apparatus of claim 4, wherein each of said propelling units includes means for interrupting the removal of filter rod sections from the respective source and said control means include means for activating the interrupting means of the respective propelling units in the event of malfunction of the corresponding propelling unit and/or the associated conveyor.

7. The apparatus of claim 6, wherein said signal generating means includes a plurality of signal generators for each of said propelling units and the corresponding conveyors, each of said propelling units and the corresponding conveyors having portions which are likely to develop malfunctions and said signal generators being positioned to generate signals in response to development of malfunctions at said portions of said propelling units and the respective conveyors, said control means including means for activating the interrupting means of a propelling unit in response to a signal from any one of the corresponding signal generators.

8. The apparatus of claim 1, wherein said filter processing means includes groups of m machines each and said sender means includes one sender for each of said groups, each sender having 2m propelling units and said conveyor means including a set of 2m conveyors for each of said senders, each of said sets including conveyors connecting m propelling units of one of said senders with the machines of one of said groups and conveyors connecting the remaining m propelling units of the respective sender with one machine each of each other group of machines.

9. The apparatus of claim 1, wherein said filter processing means includes m+1 groups of m machines each and said sender means includes a sender for each of said groups, each sender having 2m propelling units and said conveyor means including a set of 2m conveyors for each of said senders, each of said sets including conveyors connecting m propelling units of the respective sender with the machines of one of said groups and conveyors connecting the remaining m propelling units of the respective sender with one machine of each other group of machines.

10. The apparatus of claim 1, wherein each of said receiving means includes discrete first and second receiving units for transferring filter rod sections from the respective first and second conveyors into the magazine of the corresponding machine.

11. The apparatus of claim 10, wherein each of said receiving units includes means for forcibly feeding filter rod sections into the magazine of the respective processing machine.

12. The apparatus of claim 11, wherein the feeding means of each of said receiving means are spaced apart from each other so that the filter rod sections which are delivered by the respective first and second conveyors enter different portions of the corresponding magazine.

13. The apparatus of claim 12, wherein each of said magazines has two opposite sides and the feeding means of the respective receiving means are positioned to deliver filter rod sections into the corresponding magazine at said opposite sides thereof.

14. The apparatus of claim 11, wherein each of said feeding means includes a plurality of endless flexible elements which define channels for the passage of filter rod sections into the respective magazine.

15. The apparatus of claim 14, wherein said flexible elements are endless belts having parallel reaches which define said channels.

16. The apparatus of claim 1, further comprising control means including means for monitoring the supplies of filter rod sections in said magazines.

17. The apparatus of claim 16, wherein said control means further includes means for actuating one of the respective propelling units when the supply of filter rod sections in a magazine is reduced to a given minimum value.

18. The apparatus of claim 16, wherein said control means further includes means for arresting the operative propelling unit when the supply of filter rod sections in a magazine rises to a predetermined maximum value.

19. The apparatus of claim 1, further comprising a control unit for each of said processing machines, each of said control units including first and second means for monitoring the supply of filter rod sections in the respective magazine, each first monitoring means including means for initiating the delivery of filter rod sections from the respective propelling unit of said first sender when the supply of filter rod sections in the magazine is depleted below a first level and each second monitoring means including means for initiating the delivery of filter rod sections by the respective propelling unit of said second sender when the supply of filter rod sections in the magazine is depleted below a lower second level.

20. The apparatus of claim 19, wherein each of said means for initiating the delivery of filter rod sections includes a first signal generator and each first monitoring means further comprises a second signal generator which interrupts the delivery of filter rod sections by the respective propelling unit when the supply of filter rod sections in the corresponding magazine is replenished to a given value.

21. The apparatus of claim 20, wherein each of said means for initiating the delivery of filter rod sections further includes a third signal generator arranged to transmit a signal when the supply of filter rod sections in the respective magazine is depleted to said second level and a fourth signal generator which interrupts the delivery of filter rod sections by the respective propelling unit when the supply of filter rod sections in such magazine is replenished.

22. The apparatus of claim 21, wherein said fourth signal generator of each of said second monitoring means is the second signal generator of the respective first monitoring means.

23. The apparatus of claim 1, further comprising a junction for the first and second conveyors which deliver filter rod sections to the magazine of at least one of said processing machines.

24. The apparatus of claim 23, wherein the outlets of the first and second conveyors for the delivery of filter rod sections to said one machine are located at said junction and said junction includes an additional conveyor for delivery of filter rod sections from the outlet of one of the respective first and second conveyors to the magazine of said one machine.

25. The apparatus of claim 24, wherein said additional conveyor has an inlet and further comprising shifting means for placing the inlet of said additional conveyor into register with the outlet of either of the respective first and second conveyors.

26. The apparatus of claim 25, further comprising control means, one for each first conveyor and the corresponding second conveyor and each including means for normally effecting the operation of only one of the propelling units which deliver filter rod sections to the respective first and second conveyors and means for automatically starting the other propelling unit in the event of malfunction of the one propelling unit and/or the associated conveyor, and vice versa, said shifting means forming part of the respective control means.

27. The apparatus of claim 24, wherein said junction further comprises a plurality of guide members at least one of which is movable between open and closed positions.

28. The apparatus of claim 27, wherein the first and second conveyors for delivery of filter rod sections to said one processing machine and said additional conveyor have coplanar portions in the regions of outlets of such first and second conveyors, said one guide member of said junction being located in the common plane of said conveyor portions on movement of said one guide member to said closed position.

29. The apparatus of claim 1, further comprising a plurality of junctions each connecting a conveyor receiving filter rod sections from a propelling unit of said first sender with a conveyor receiving filter rod sections from an additional propelling unit.

30. The apparatus of claim 29, wherein said additional propelling units form part of said second sender.

* * * * *

UNITED STATES PATENT AND TRADEMARK OFFICE
CERTIFICATE OF CORRECTION

PATENT NO. : 4,595,025

DATED : June 17, 1986

INVENTOR(S) : Günter WAHLE et al.

It is certified that error appears in the above-identified patent and that said Letters Patent are hereby corrected as shown below:

Foremost Page: [30] FOREIGN APPLICATION PRIORITY DATA:
before Oct. 21, 1982 [DE] Fed. Rep. of Germany ..... 3238902, add the following: --Feb. 2, 1980 [DE] Fed. Rep. of Germany ..... P 30 03 880.3--.
Col. 10, line 2, "ronveyor" should read --conveyor--.
Col. 21, line 60, "tha" should read --the--.

Signed and Sealed this

Thirteenth Day of October, 1987

Attest:

DONALD J. QUIGG

Attesting Officer

Commissioner of Patents and Trademarks